US012241908B2

(12) United States Patent
Todorokihara

(10) Patent No.: US 12,241,908 B2
(45) Date of Patent: Mar. 4, 2025

(54) VIBRATION RECTIFICATION ERROR CORRECTION DEVICE, SENSOR MODULE, AND VIBRATION RECTIFICATION ERROR CORRECTION METHOD

(71) Applicant: SEIKO EPSON CORPORATION, Tokyo (JP)

(72) Inventor: Masayoshi Todorokihara, Suwa (JP)

(73) Assignee: SEIKO EPSON CORPORATION (JP)

( * ) Notice: Subject to any disclaimer, the term of this patent is extended or adjusted under 35 U.S.C. 154(b) by 150 days.

(21) Appl. No.: 18/070,080

(22) Filed: Nov. 28, 2022

(65) Prior Publication Data

US 2023/0168272 A1 Jun. 1, 2023

(30) Foreign Application Priority Data

Nov. 29, 2021 (JP) .................. 2021-192657

(51) Int. Cl.
*G01P 15/097* (2006.01)
*G01D 18/00* (2006.01)
*G01P 15/18* (2013.01)

(52) U.S. Cl.
CPC ............ *G01P 15/097* (2013.01); *G01D 18/00* (2013.01); *G01P 15/18* (2013.01)

(58) Field of Classification Search
CPC ........ G01P 15/097; G01P 15/18; G01D 18/00
See application file for complete search history.

(56) References Cited

U.S. PATENT DOCUMENTS

| | | | | |
|---|---|---|---|---|
| 11,079,403 B2* | 8/2021 | Sato | .................... | G01P 15/0802 |
| 11,092,616 B2* | 8/2021 | Oliaei | ................ | G01C 19/5776 |
| 11,733,262 B2* | 8/2023 | Sato | ........................ | H03M 3/30 |
| | | | | 73/514.29 |
| 11,808,572 B2* | 11/2023 | Todorokihara | ........ | G01P 15/125 |
| 2019/0324052 A1* | 10/2019 | Sato | .................... | H03M 3/378 |
| 2019/0331491 A1* | 10/2019 | Todorokihara | .......... | G01P 15/10 |
| 2019/0334544 A1* | 10/2019 | Todorokihara | ..... | G01C 19/5776 |
| 2020/0195260 A1* | 6/2020 | Sato | ...................... | H03L 7/0893 |
| 2021/0325424 A1* | 10/2021 | Sato | ...................... | G01P 15/097 |
| 2022/0206036 A1* | 6/2022 | Todorokihara | ........ | G01P 15/097 |
| 2022/0206038 A1* | 6/2022 | Todorokihara | ........ | G01P 15/097 |

FOREIGN PATENT DOCUMENTS

JP 2019-190897 A 10/2019

* cited by examiner

*Primary Examiner* — Helen C Kwok
(74) *Attorney, Agent, or Firm* — Harness, Dickey & Pierce, P.L.C.

(57) ABSTRACT

A vibration rectification error correction device includes a reference signal generation circuit configured to output a reference signal, a frequency delta-sigma modulation circuit configured to perform a frequency delta-sigma modulation on the reference signal using a measurement target signal to generate a frequency delta-sigma modulation signal, a first filter which is disposed in a posterior stage of the frequency delta-sigma modulation circuit, and operates in sync with the measurement target signal, and a second filter which is disposed in a posterior stage of the first filter, and operates in sync with a first frequency signal asynchronous with the reference signal.

11 Claims, 19 Drawing Sheets

VIBRATION RECTIFICATION ERROR CORRECTION DEVICE, SENSOR MODULE, AND VIBRATION RECTIFICATION ERROR CORRECTION METHOD

The present application is based on, and claims priority from JP Application Serial Number 2021-192657, filed Nov. 29, 2021, the disclosure of which is hereby incorporated by reference herein in its entirety.

BACKGROUND

1. Technical Field

The present disclosure relates to a vibration rectification error correction device, a sensor module, and a vibration rectification error correction method.

2. Related Art

In JP-A-2019-190897 (Document 1), there is disclosed a sensor module having a configuration of making a first low-pass filter operate in sync with an output signal of a physical quantity sensor, and performing resampling in sync with a reference clock with a second low-pass filter of a posterior stage. According to this sensor module, by adjusting a vibration rectification error caused by nonlinearity which occurs in input and output of the whole of the low-pass filter so as to be opposite in phase to a vibration rectification error caused by a cantilever resonance of the physical quantity sensor, it is possible to cancel out each other's vibration rectification errors to reduce the vibration rectification error occurring in the final output.

In the sensor module described in Document 1, since the second low-pass filter operates in sync with the reference clock, for example, in order to obtain data in sync with a signal asynchronous with the reference clock such as an external trigger signal, it becomes necessary to dispose a synchronous circuit large in circuit size in a posterior stage of the second low-pass filter, or to perform an arithmetic operation of post processing heavy in load.

SUMMARY

A vibration rectification error correction device according to an aspect of the present disclosure includes a reference signal generation circuit configured to output a reference signal, a frequency delta-sigma modulation circuit configured to perform a frequency delta-sigma modulation on the reference signal using a measurement target signal to generate a frequency delta-sigma modulation signal, a first filter which is disposed in a posterior stage of the frequency delta-sigma modulation circuit, and operates in sync with the measurement target signal, and a second filter which is disposed in a posterior stage of the first filter, and operates in sync with a first frequency signal asynchronous with the reference signal.

A sensor module according to an aspect of the present disclosure includes the vibration rectification error correction device according to the aspect, and a physical quantity sensor.

A vibration rectification error correction method according to an aspect of the present disclosure includes performing a frequency delta-sigma modulation on a reference signal using a measurement target signal to generate a frequency delta-sigma modulation signal, performing first filter processing on a signal based on the frequency delta-sigma modulation signal in sync with the measurement target signal, and performing second filter processing on a signal based on a signal obtained by the first filter processing, in sync with a first frequency signal asynchronous with the reference signal.

DESCRIPTION OF EXEMPLARY EMBODIMENTS

Some preferred embodiments of the present disclosure will hereinafter be described in detail using the drawings. It should be noted that the embodiments described below do not unreasonably limit the content of the present disclosure as set forth in the appended claims. Further, all of the constituents described below are not necessarily essential elements of the present disclosure.

1. First Embodiment

1-1. Structure of Sensor Module

First, an example of a structure of a sensor module according to a first embodiment will be described.

Figure 1:
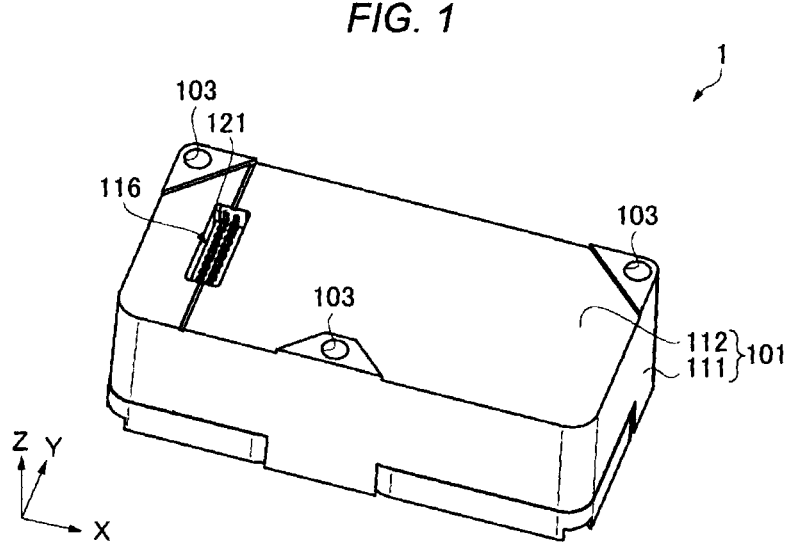
FIG. 1 is a perspective view of a sensor module.

FIG. 1 is a perspective view of the sensor module 1 when viewed from a mounting target surface to which the sensor module 1 is fixed. In the following description, the description is presented defining a direction along a long side of the sensor module 1 forming a rectangular shape in a plan view as an X-axis direction, a direction perpendicular to the X-axis direction in the plan view as a Y-axis direction, and a thickness direction of the sensor module 1 as a Z-axis direction.

The sensor module 1 is a rectangular solid having a rectangular planar shape, and has long sides along the X-axis direction, and short sides along the Y-axis direction perpendicular to the X-axis direction. In two positions in the vicinities of end portions of one of the long sides, and one position in a central portion of the other of the long sides, there are formed screw holes 103. The sensor module 1 is used in a state in which fixation screws are threaded into the respective screw holes 103 at the three positions to fix the sensor module 1 to the mounting target surface of a mounting target body of a structure such as a building, a bulletin board, or a variety of types of devices.

As shown in FIG. 1, a surface of the sensor module 1 viewed from the mounting target surface is provided with an opening 121. Inside the opening 121, there is disposed a connector 116 of a plug type. The connector 116 has a plurality of pins arranged in two rows, and the plurality of pins is arranged in the Y-axis direction in each of the rows. To the connector 116, there is coupled a connector of a socket type not shown from the mounting target body, whereby transmission and reception of an electrical signal such as a drive voltage or detection data of the sensor module 1 are performed.

Figure 2:
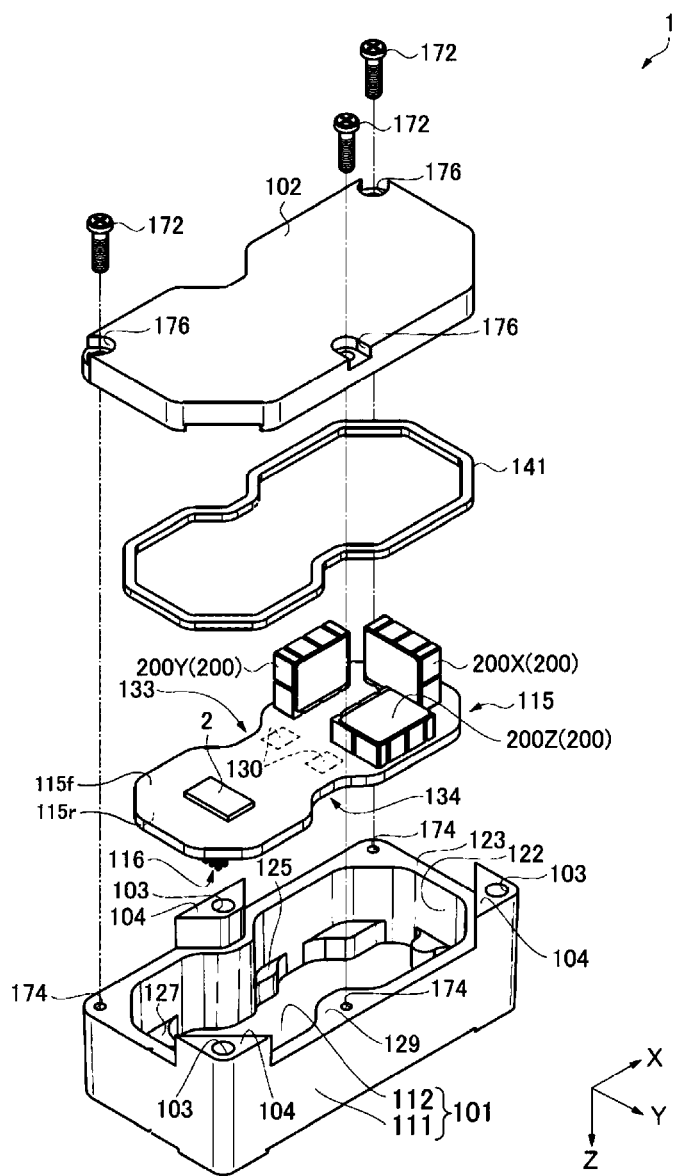
FIG. 2 is an exploded perspective view of the sensor module.

FIG. 2 is an exploded perspective view of the sensor module 1. As shown in FIG. 2, the sensor module 1 is constituted by a container 101, a lid 102, a seal member 141, a circuit board 115, and so on. In a detailed description, the sensor module 1 has a configuration in which the circuit board 115 is attached inside the container 101 via a fixation member 130, and an opening of the container 101 is covered with the lid 102 via the seal member 141 with cushioning properties.

The container 101 is a housing container for the circuit board 115 formed to have a box-like shape having an internal space using, for example, aluminum. An outer shape of the container 101 is a rectangular solid having a substantially rectangular planar shape similarly to the overall shape of the sensor module 1 described above, and fixation protrusions 104 are disposed at two positions in the vicinities of both end portions of one of the long sides and one position in a central portion of the other of the long sides. The screw holes 103 are provided to the fixation protrusions 104, respectively.

The container 101 is shaped like a box having a rectangular solid outer shape, and an opening at one side. The inside of the container 101 is an internal space surrounded by a bottom wall 112 and a side wall 111. In other words, the container 101 is shaped like a box having one face opposed to the bottom wall 112 as an opening face 123, the outer edge of the circuit board 115 is arranged along an inner surface 122 of the side wall 111, and the lid 102 is fixed so as to cover the opening. On the opening face 123, there are erected the fixation protrusions 104 at the two positions in the vicinities of the both end portions of one of the long sides of the container 101, and the one position in the central portion of the other of the long sides. Further, an upper surface, namely a surface exposed toward the −Z direction, of each of the fixation protrusions 104 projects from the upper surface of the container 101.

Further, in the internal space of the container 101, there is disposed a protrusion 129 protruding from the side wall 111 toward the internal space from the bottom wall 112 to the opening face 123 in a central portion of the one of the long sides opposed to the fixation protrusion 104 disposed in the central portion of the other of the long sides. An upper surface of the protrusion 129 is provided with an internal thread 174. The lid 102 is fixed to the container 101 via the seal member 141 with a screw 172 inserted into a through hole 176 and the internal thread 174. It should be noted that the protrusion 129 and the fixation protrusion 104 are disposed at positions opposed to constrictions 133, 134 of the circuit board 115 described later, respectively.

In the internal space of the container 101, there are disposed a first pedestal 127 and second pedestals 125 each protruding like a step raised toward the opening face 123 from the bottom wall 112. The first pedestal 127 is disposed at a position opposed an arrangement area of the connector 116 of the plug type attached to the circuit board 115. The first pedestal 127 is provided with an opening 121 shown in FIG. 1, and the connector 116 of the plug type is inserted into the opening 121. The first pedestal 127 functions as a pedestal for fixing the circuit board 115 to the container 101.

The second pedestals 125 are located at an opposite side to the first pedestal 127 with respect to the fixation protrusion 104 and the protrusion 129 located in the central portions of the long sides, and are disposed in the vicinities of the fixation protrusion 104 and the protrusion 129. The second pedestals 125 function as pedestals for fixing the circuit board 115 to the container 101 at the opposite side to the first pedestal 127 with respect to the fixation protrusion 104 and the protrusion 129.

It should be noted that although the description is presented assuming that the outer shape of the container 101 is shaped like the box which is the rectangular solid having the substantially rectangular planar shape, and which does not have a lid, but this is not a limitation, and the planar shape of the outer shape of the container 101 can be a square, a hexagon, a octagon, or the like. Further, in the planar shape of the outer shape of the container 101, corners of vertex portions of the polygon can be chamfered, and further, it is possible to adopt a planar shape in which any one of the sides is formed of a curved line. Further, the planar shape of the inside of the container 101 is not limited to the shape described above, and can also be another shape. Further, the planar shapes of the outer shape and the inside of the container 101 can be shapes similar to each other, or not required to be the shapes similar to each other.

The circuit board 115 is a multilayer board provided with a plurality of through holes and so on, and there is used, for example, a glass epoxy board, a composite board, or a ceramic board.

The circuit board 115 has a second surface 115r at the bottom wall 112 side, and a first surface 115f having an obverse-reverse relationship with the second surface 115r. On the first surface 115f of the circuit board 115, there are mounted the vibration rectification error correction device 2, three physical quantity sensors 200, other electronic components not shown, and so on. Further, on the second surface 115r of the circuit board 115, there is mounted the connector 116. It should be noted that although an illustration and an explanation thereof will be omitted, the circuit board 115 can be provided with other interconnections, terminal electrodes, and so on.

The circuit board 115 is provided with the constrictions 133, 134 where the outer edge of the circuit board 115 is constricted in a central portion in the X-axis direction along the long sides of the container 101 in the plan view. The constrictions 133, 134 are disposed at both sides in the Y-axis direction of the circuit board 115 in the plan view, and are constricted from the outer edges of the circuit board 115 toward the center thereof. Further, the constrictions 133, 134 are disposed so as to be opposed to the protrusion 129 and the fixation protrusion 104 of the container 101, respectively.

The circuit board 115 is inserted in the internal space of the container 101 with the second surface 115r facing to the first pedestal 127 and the second pedestals 125. Further, the circuit board 115 is supported by the container 101 with the first pedestal 127 and the second pedestals 125.

The three physical quantity sensors 200 are each a frequency variation sensor the output signal of which varies in frequency in accordance with a physical quantity to be applied. Among the three physical quantity sensors 200, the physical quantity sensor 200X detects a physical quantity in the X-axis direction, the physical quantity sensor 200Y detects a physical quantity in the Y-axis direction, and the physical quantity sensor 200Z detects a physical quantity in the Z-axis direction. Specifically, the physical quantity sensor 200X is erected so that obverse and reverse surfaces of the package face to the X-axis direction, and so that a side surface thereof is opposed to the first surface 115f of the circuit board 115. Further, the physical quantity sensor 200X outputs a signal corresponding to the physical quantity in the X-axis direction thus detected. The physical quantity sensor 200Y is erected so that obverse and reverse surfaces of the package face to the Y-axis direction, and so that a side surface thereof is opposed to the first surface 115f of the circuit board 115. Further, the physical quantity sensor 200Y outputs a signal corresponding to the physical quantity in the Y-axis direction thus detected. The physical quantity sensor 200Z is disposed so that obverse and reverse surfaces of the package face to the Z-axis direction, namely the obverse and reverse surfaces of the package are opposed straight to the first surface 115f of the circuit board 115. Further, the physical quantity sensor 200Z outputs a signal corresponding to the physical quantity in the Z-axis direction thus detected.

The vibration rectification error correction device 2 is electrically coupled to the physical quantity sensors 200X, 200Y, and 200Z via interconnections and electronic components not shown. Further, the vibration rectification error correction device 2 generates physical quantity data reduced in vibration rectification error based on the output signals of the physical quantity sensors 200X, 200Y, and 200Z.

1-2. Structure of Physical Quantity Sensor

Then, an example of a structure of each of the physical quantity sensors 200 will be described citing when the physical quantity sensor 200 is an acceleration sensor as an example. The three physical quantity sensors 200 shown in FIG. 2, namely the physical quantity sensors 200X, 200Y, and 200Z can be the same in structure as each other.

Figure 3:
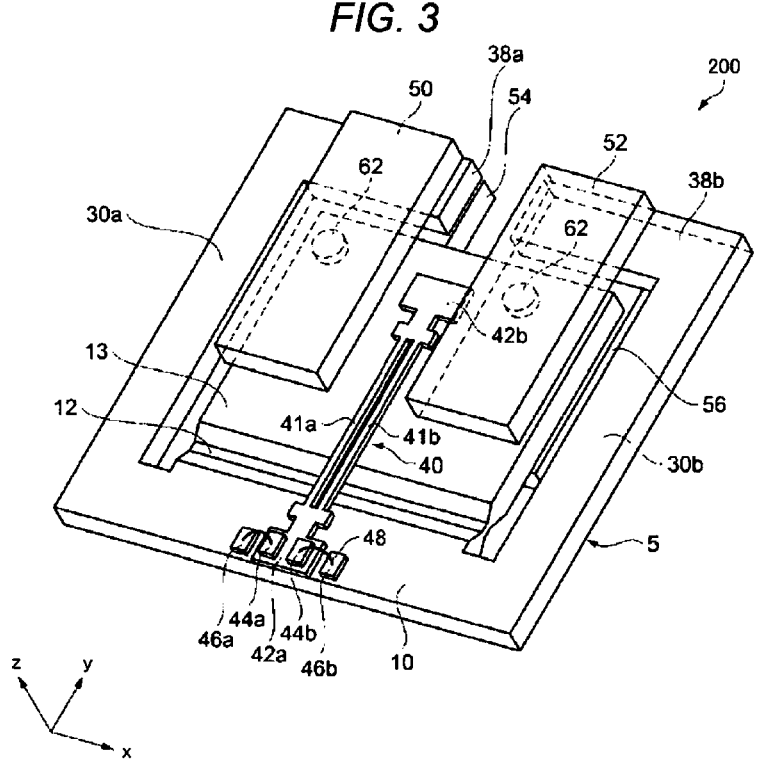
FIG. 3 is a perspective view of a physical quantity sensor.
Figure 4:
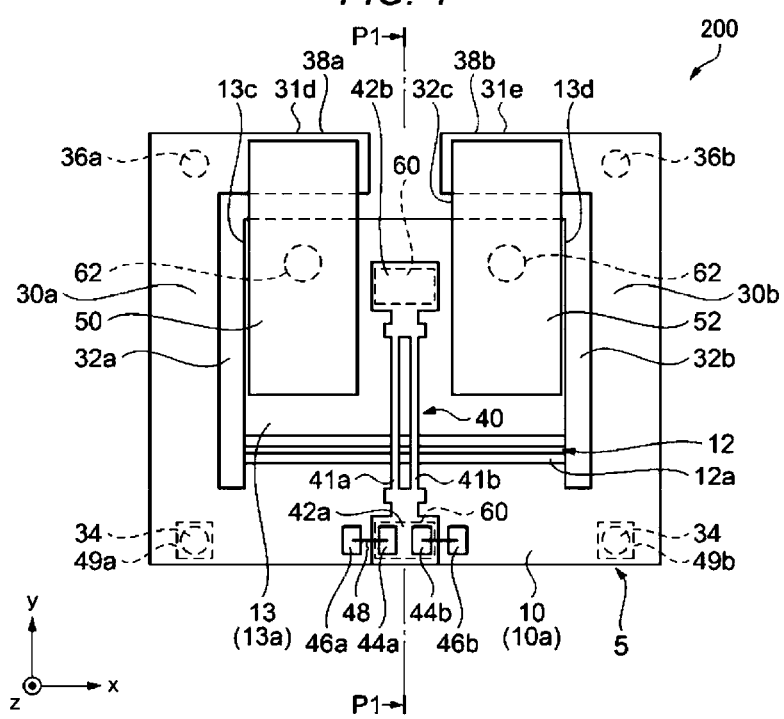
FIG. 4 is a plan view of the physical quantity sensor.
Figure 5:
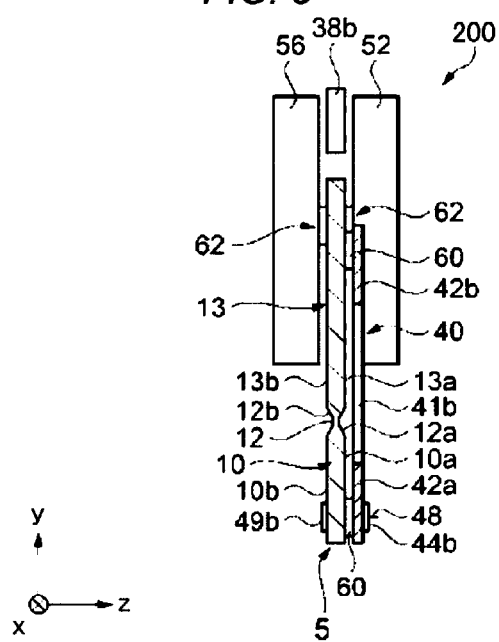
FIG. 5 is a cross-sectional view along a line P1-P1 shown in FIG. 4.

FIG. 3 is a perspective view of the physical quantity sensor 200, FIG. 4 is a plan view of the physical quantity sensor 200, and FIG. 5 is a cross-sectional view in a line P1-P1 in FIG. 4. It should be noted that FIG. 3 through FIG. 5 each illustrate only an inside of the package of the physical quantity sensor 200. In each of the following drawings, an x axis, a y axis, and a z axis are illustrated as three axes perpendicular to each other for the sake of convenience of explanation. Further, a plan view viewed from the z-axis direction as a thickness direction of extending parts 38a, 38b is also referred to simply as a "plan view" in the following description for the sake of convenience of explanation.

As shown in FIG. 3 through FIG. 5, the physical quantity sensor 200 has a substrate part 5 and four weights 50, 52, 54, and 56.

The substrate part 5 is provided with a base 10, a joint 12, a movable part 13, two support parts 30a, 30b, and a physical quantity detection element 40, wherein the base 10 has principal surfaces 10a, 10b extending in the x-axis direction and facing to respective directions opposite to each other, the joint 12 extends from the base 10 in the y-axis direction, the movable part 13 extends from the joint 12 toward the opposite direction to the base 10 so as to form a rectangular shape, the two support parts 30a, 30b extend along the outer edges of the movable part 13 from the both ends in the x-axis direction of the base 10, respectively, and the physical quantity detection element 40 is bridged from the base 10 to the movable part 13 and is bonded to the base 10 and the movable part 13.

In the two support parts 30a, 30b, the support part 30a extends along the y axis with a gap 32a with the movable part 13, and is provided with a bonding part 36a for fixing the support part 30a, and the extending part 38a extending along the x axis with a gap 32c with the movable part 13. In other words, the support part 30a extends along the y axis with the gap 32a with the movable part 13, and is provided with the extending part 38a extending along the x axis with the gap 32c with the movable part 13, and is provided with the bonding part 36a disposed between the support part 30a and the extending part 38a. Further, the support part 30b extends along the y axis with a gap 32b with the movable part 13, and is provided with a bonding part 36b for fixing the support part 30b, and the extending part 38b extending along the x axis with the gap 32c with the movable part 13. In other words, the support part 30b extends along the y axis with the gap 32b with the movable part 13, and is provided with the extending part 38b extending along the x axis with the gap 32c with the movable part 13, and is provided with the bonding part 36b disposed between the support part 30b and the extending part 38b.

It should be noted that the bonding parts 36a, 36b provided respectively to the support parts 30a, 30b are for mounting the substrate part 5 of the physical quantity sensor 200 on an external member such as a package. Further, the base 10, the joint 12, the movable part 13, the support parts 30a, 30b, and the extending parts 38a, 38b can be formed integrally with each other.

The movable part 13 is surrounded by the support parts 30a, 30b and the base 10, and is coupled to the base 10 via the joint 12 to be in a cantilevered state. Further, the movable part 13 has principal surfaces 13a, 13b facing to the directions opposite to each other, a side surface 13c extending along the support part 30a, and a side surface 13d extending along the support part 30b. The principal surface 13a is a surface facing to the same side as the principal surface 10a of the base 10, and the principal surface 13b is a surface facing to the same side as the principal surface 10b of the base 10.

The joint 12 is disposed between the base 10 and the movable part 13 to couple the base 10 and the movable part 13 to each other. The joint 12 is formed to have a thickness thinner than the thickness of the base 10 and the thickness of the movable part 13. The joint 12 has grooves 12a, 12b. These grooves 12a, 12b are formed along the x axis, and when the movable part 13 is displaced with respect to the base 10, the grooves 12a, 12b of the joint 12 each function as a pivot, namely an intermediate hinge. Such a joint 12 and such a movable part 13 function as a cantilever.

Further, to the surface continuing from the principal surface 10a of the base 10 to the principal surface 13a of the movable part 13, there is fixed the physical quantity detection element 40 with a joining material 60. The fixation positions of the physical quantity detection element 40 are two places, namely central positions in the x-axis direction of the principal surface 10a and the principal surface 13a, respectively.

The physical quantity detection element 40 has a base part 42a fixed to the principal surface 10a of the base 10 with the joining material 60, a base part 42b fixed to the principal surface 13a of the movable part 13 with the joining material 60, and vibrating beams 41a, 41b located between the base part 42a and the base part 42b and configured to detect a physical quantity. In this case, the shape of each of the vibrating beams 41a, 41b is a prismatic shape, and when a drive signal as an alternating-current voltage is applied to excitation electrodes not shown respectively provided to the vibrating beams 41a, 41b, the vibrating beams 41a, 41b make a flexural vibration along the x axis so as to get away from each other and come closer to each other. In other words, the physical quantity detection element 40 is a tuning-fork vibrator element.

On the base part 42a of the physical quantity detection element 40, there are disposed extraction electrodes 44a, 44b. These extraction electrodes 44a, 44b are electrically coupled to excitation electrodes not shown provided to the vibrating beams 41a, 41b. The extraction electrodes 44a, 44b are electrically coupled to coupling terminals 46a, 46b provided to the principal surface 10a of the base 10 with metal wires 48. The coupling terminals 46a, 46b are electrically coupled respectively to external coupling terminals 49a, 49b with interconnections not shown. The external coupling terminals 49a, 49b are disposed at the side of the principal surface 10b of the base 10 as a surface at which the physical quantity sensor 200 is mounted on the package or the like so as to overlap package bonding parts 34 in the plan view. The package bonding parts 34 are for mounting the substrate part 5 of the physical quantity sensor 200 on the external member such as the package, and are disposed at two places, namely end portions at the both end sides in the x-axis direction of the base 10.

The physical quantity detection element 40 is formed by patterning a crystal substrate, which has been carved out from a crystal raw stone at a predetermined angle, using a photolithography process and an etching process. In this case, it is desirable for the physical quantity detection element 40 to be formed of the same material as the material of the base 10 and the movable part 13 taking the reduction of the difference in linear expansion coefficient between the base 10 and the movable part 13 into consideration.

The weights 50, 52, 54, and 56 each have a rectangular planar shape, and are provided to the movable part 13. The weights 50, 52 are fixed to the principal surface 13a of the movable part 13 with a joining member 62, and the weights 54, 56 are fixed to the principal surface 13b of the movable part 13 with a joining member 62. Here, one side of the weight 50 fixed to the principal surface 13a, namely a marginal side of the rectangular shape, is aligned in direction with the side surface 13c of the movable part 13 in the plan view, and at the same time, another side thereof is aligned in direction with a side surface 31d of the extending part 38a. Due to such alignment in direction, the weight 50 is disposed at the side of the side surface 13c of the movable part 13, and the weight 50 and the extending part 38a are disposed so as to overlap each other in the plan view. Similarly, one side of the weight 52 fixed to the principal surface 13a, namely a marginal side of the rectangular shape, is aligned in direction with the side surface 13d of the movable part 13 in the plan view, and at the same time, another side thereof is aligned in direction with a side surface 31e of the extending part 38b. Thus, the weight 52 is disposed at a side of the side surface 13d of the movable part 13, and the weight 52 and the extending part 38b are disposed so as to overlap each other in the plan view. One side of the weight 54 having a rectangular shape fixed to the principal surface 13b is aligned in direction with the side surface 13c of the movable part 13 in the plan view, and at the same time, another side thereof is aligned in direction with the side surface 31d of the extending part 38a. Thus, the weight 54 is disposed at the side of the side surface 13c of the movable part 13, and the weight 54 and the extending part 38a are disposed so as to overlap each other in the plan view. Similarly, one side of the weight 56 having a rectangular shape fixed to the principal surface 13b is aligned in direction with the side surface 13d of the movable part 13 in the plan view, and at the same time, another side thereof is aligned in direction with the side surface 31e of the extending part 38b. Thus, the weight 56 is disposed at a side of the side surface 13d of the movable part 13, and the weight 56 and the extending part 38b are disposed so as to overlap each other in the plan view.

In the weights 50, 52, 54, and 56 arranged in such a manner, the weights 50, 52 are arranged symmetrically about the physical quantity detection element 40, and the weights 54, 56 are arranged so as to respectively overlap the weights 50, 52 in the plan view. These weights 50, 52, 54, and 56 are fixed to the movable part 13 with the joining members 62 disposed at respective barycentric positions of the weights 50, 52, 54, and 56. Further, since the weights 50, 54 overlap the extending part 38a, and the weights 52, 56 overlap the extending part 38b in the plan view, when an excessive amount of the physical quantity is applied, the weights 50, 52, 54, and 56 have contact with the extending parts 38a, 38b, and thus, it is possible to suppress the displacements of the weights 50, 52, 54, and 56.

The joining members 62 are each formed of a silicone resin-based thermosetting adhesive or the like. The joining members 62 are applied in two places of each of the principal surface 13a and the principal surface 13b of the movable part 13, and then heated to be cured after the weights 50, 52, 54, and 56 are mounted thereon, to thereby fix the weights 50, 52, 54, and 56 to the movable part 13. It should be noted that the joining surfaces opposed to the principal surface 13a and the principal surface 13b of the movable part 13 of the weights 50, 52, 54, and 56 are each a rough surface. Thus, when fixing the weights 50, 52, 54, and 56 to the movable part 13, the joining area in each of the joining surfaces increases, and thus, the joining strength can be increased.

Figure 6:
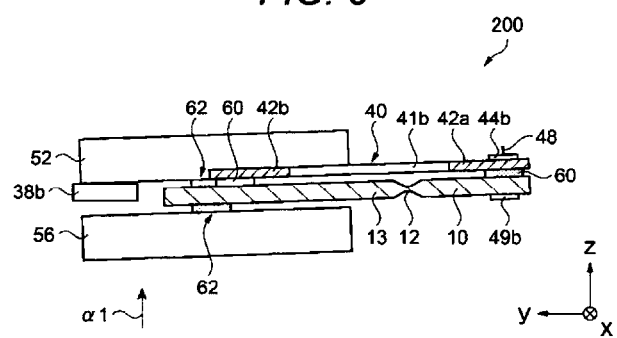
FIG. 6 is an explanatory diagram of an operation of the physical quantity sensor.

As shown in FIG. 6, when acceleration toward the +z direction indicated by an arrow α1 is applied to the physical quantity sensor 200 configured as described above, a force acts on the movable part 13 toward the −z direction, and the movable part 13 is displaced toward the −z direction taking the joint 12 as a pivot point. Thus, a force in the direction in which the base part 42a and the base part 42b get away from each other along the y axis is applied to the physical quantity detection element 40, and tensile stress is generated in the vibrating beams 41a, 41b. Therefore, a frequency with which the vibrating beams 41a, 41b vibrate rises.

Figure 7:
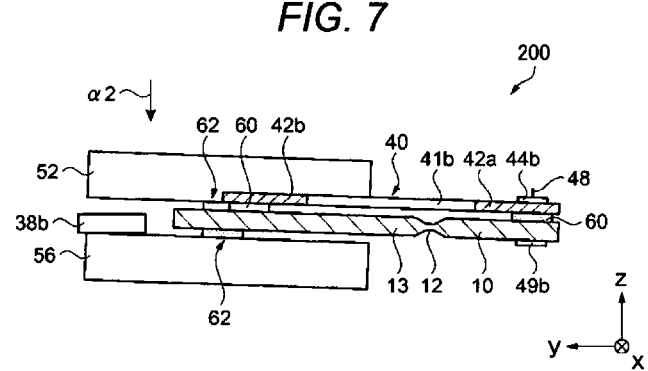
FIG. 7 is an explanatory diagram of the operation of the physical quantity sensor.

In contrast, as shown in FIG. 7, when acceleration toward the −z direction indicated by an arrow α2 is applied to the physical quantity sensor 200, a force acts on the movable part 13 toward the +z direction, and the movable part 13 is displaced toward the +z direction taking the joint 12 as a pivot point. Thus, a force in the direction in which the base part 42a and the base part 42b come close to each other along the y axis is applied to the physical quantity detection element 40, and compressive stress is generated in the vibrating beams 41a, 41b. Therefore, a frequency with which the vibrating beams 41a, 41b vibrate falls.

When the frequency with which the vibrating beams 41a, 41b vibrate varies in accordance with the acceleration, a frequency of a signal output from the external coupling terminals 49a, 49b of the physical quantity sensor 200 varies. The sensor module 1 is capable of calculate the value of the acceleration applied to the physical quantity sensor 200 based on the variation in frequency of the output signal of the physical quantity sensor 200.

It should be noted that in order to increase the detection accuracy of the acceleration as the physical quantity, it is desirable for the joint 12 for coupling the base 10 as a stationary part and the movable part 13 to each other to be formed of quartz crystal as a material high in Q-value. For example, the base 10, the support parts 30a, 30b, and the movable part 13 can be formed of a quartz crystal plate, and the grooves 12a, 12b of the joint 12 can be formed by performing a half-etching process from the both surfaces of the crystal plate.

1-3. Functional Configuration of Sensor Module

Figure 8:
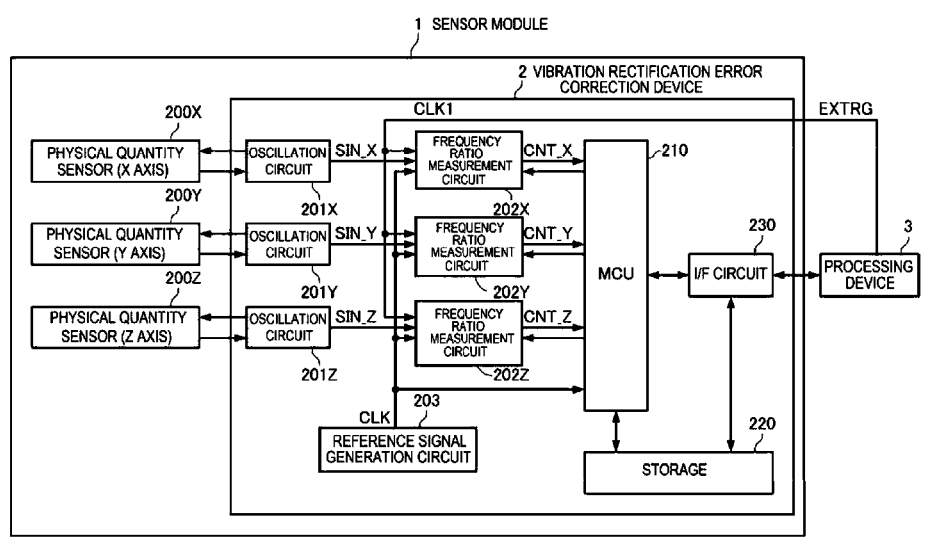
FIG. 8 is a functional block diagram of the sensor module according to a first embodiment.

FIG. 8 is a functional block diagram of the sensor module 1 according to the first embodiment. As described above, the sensor module 1 is provided with the physical quantity sensors 200X, 200Y, and 200Z, and the vibration rectification error correction device 2.

The vibration rectification error correction device 2 includes oscillation circuits 201X, 201Y, and 201Z, frequency ratio measurement circuits 202X, 202Y, and 202Z, a micro-control unit 210, a storage 220, and an interface circuit 230.

The oscillation circuit 201X amplifies the output signal of the physical quantity sensor 200X to generate a drive signal, and then applies the drive signal to the physical quantity sensor 200X. Due to the drive signal, the vibrating beams 41a, 41b of the physical quantity sensor 200X vibrate with the frequency corresponding to the acceleration in the X-axis direction, and the signal with that frequency is output from the physical quantity sensor 200X. Further, the oscillation circuit 201X outputs a measurement target signal SIN_X as a rectangular wave signal obtained by amplifying the output signal of the physical quantity sensor 200X to the frequency ratio measurement circuit 202X. The measurement target signal SIN_X is a signal based on the output signal of the physical quantity sensor 200X.

Similarly, the oscillation circuit 201Y amplifies the output signal of the physical quantity sensor 200Y to generate a drive signal, and then applies the drive signal to the physical quantity sensor 200Y. Due to the drive signal, the vibrating beams 41a, 41b of the physical quantity sensor 200Y vibrate with the frequency corresponding to the acceleration in the Y-axis direction, and the signal with that frequency is output from the physical quantity sensor 200Y. Further, the oscillation circuit 201Y outputs a measurement target signal SIN_Y as a rectangular wave signal obtained by amplifying the output signal of the physical quantity sensor 200Y to the frequency ratio measurement circuit 202Y. The measurement target signal SIN_Y is a signal based on the output signal of the physical quantity sensor 200Y.

Similarly, the oscillation circuit 201Z amplifies the output signal of the physical quantity sensor 200Z to generate a drive signal, and then applies the drive signal to the physical quantity sensor 200Z. Due to the drive signal, the vibrating beams 41a, 41b of the physical quantity sensor 200Z vibrate with the frequency corresponding to the acceleration in the Z-axis direction, and the signal with that frequency is output from the physical quantity sensor 200Z. Further, the oscillation circuit 201Z outputs a measurement target signal SIN_Z as a rectangular wave signal obtained by amplifying the output signal of the physical quantity sensor 200Z to the frequency ratio measurement circuit 202Z. The measurement target signal SIN_Z is a signal based on the output signal of the physical quantity sensor 200Z.

A reference signal generation circuit 203 generates and then outputs a reference signal CLK with a constant frequency. In the present embodiment, the frequency of the reference signal CLK is higher than the frequencies of the measurement target signal SIN_X, SIN_Y, and SIN_Z. It is preferable for the reference signal CLK to be high in frequency accuracy, and the reference signal generation circuit 203 can be, for example, a temperature-compensated crystal oscillator.

The frequency ratio measurement circuit 202X counts the number of pulses of the reference signal CLK included in a predetermined period of the measurement target signal SIN_X as a signal based on the signal output from the oscillation circuit 201X, and then outputs a count value CNT_X. The count value CNT_X is a reciprocal count value corresponding to a frequency ratio between the measurement target signal SIN_X and the reference signal CLK.

The frequency ratio measurement circuit 202Y counts the number of pulses of the reference signal CLK included in a predetermined period of the measurement target signal SIN_Y output from the oscillation circuit 201Y, and then outputs a count value CNT_Y. The count value CNT_Y is a reciprocal count value corresponding to a frequency ratio between the measurement target signal SIN_Y and the reference signal CLK.

The frequency ratio measurement circuit 202Z counts the number of pulses of the reference signal CLK included in a predetermined period of the measurement target signal SIN_Z output from the oscillation circuit 201Z, and then outputs a count value CNT_Z. The count value CNT_Z is a reciprocal count value corresponding to a frequency ratio between the measurement target signal SIN_Z and the reference signal CLK.

To each of the frequency ratio measurement circuits 202X, 202Y, and 202Z, there is input a first frequency signal CLK1 asynchronous with the reference signal CLK. The first frequency signal CLK1 is a signal based on an external trigger signal EXTRG input from the outside of the sensor module 1. The external trigger signal EXTRG is output from, for example, a processing device 3 outside the sensor module 1. The first frequency signal CLK1 can be, for example, the external trigger signal EXTRG itself, or can also be a signal obtained by buffering the external trigger signal EXTRG. Then, the frequency ratio measurement circuits 202X, 202Y, and 202Z respectively output the count values CNT_X, CNT_Y, and CNT_Z in sync with the first frequency signal CLK1.

The storage 220 is for storing a program and data, and can include a volatile memory such as an SRAM or a DRAM. SRAM is an abbreviation of Static Random Access Memory, and DRAM is an abbreviation of Dynamic Random Access Memory. Further, the storage 220 can include a nonvolatile memory such as a semiconductor memory such as an EEPROM or a flash memory, a magnetic storage device such as a hard disk drive, or an optical storage device such as an optical disk drive. The EEPROM is an abbreviation of Electrically Erasable Programmable Read Only Memory.

The micro-control unit 210 operates in sync with the reference signal CLK, and executes a program not shown stored in the storage 220 to thereby perform predetermined arithmetic processing and control processing. For example, the micro-control unit 210 measures the physical quantities detected by the physical quantity sensors 200X, 200Y, and 200Z based on the count value CNT_X output from the frequency ratio measurement circuit 202X, the count value CNT_Y output from the frequency ratio measurement circuit 202Y, and the count value CNT_Z output from the frequency ratio measurement circuit 202Z, respectively. Specifically, the micro-control unit 210 converts the count value CNT_X, the count value CNT_Y, and the count value CNT_Z into the measurement value of the physical quantity in the X-axis direction, the measurement value of the physical quantity in the Y-axis direction, and the measurement value of the physical quantity in the Z-axis direction, respectively. For example, the storage 220 can store table information which defines a corresponding relationship between the count value and the measurement value of the physical quantity, or information of a relational expression between the count value and the measurement value of the physical quantity, and the micro-control unit 210 can convert the count value into the measurement value of the physical quantity with reference to such information.

It is possible for the micro-control unit 210 to transmit the measurement value of the physical quantity in the X-axis direction, the measurement value of the physical quantity in the Y-axis direction, and the measurement value of the physical quantity in the Z-axis direction to the processing device 3 via the interface circuit 230. Alternatively, it is possible to adopt a configuration in which the micro-control unit 210 writes the measurement value of the physical quantity in the X-axis direction, the measurement value of the physical quantity in the Y-axis direction, and the measurement value of the physical quantity in the Z-axis direction into the storage 220, and then the processing device 3 retrieves the measurement values via the interface circuit 230.

It should be noted that since the frequency ratio measurement circuits 202X, 202Y, and 202Z are the same in configuration and operation as each other, arbitrary one of the frequency ratio measurement circuits 202X, 202Y, and 202Z will hereinafter be referred to as a frequency ratio measurement circuit 202. Further, arbitrary one of the measurement target signals SIN_X, SIN_Y, and SIN_Z to be input to the frequency ratio measurement circuit 202 will be referred to as a measurement target signal SIN, and arbitrary one of the count values CNT_X, CNT_Y, and CNT_Z to be output from the frequency ratio measurement circuit 202 will be referred to as a count value CNT.

1-4. Vibration Rectification Error

The vibration rectification error corresponds to a DC offset caused when performing rectification due to nonlinearity of a response of the sensor module 1 with respect to the vibration, and is observed as an abnormal shift of an output offset of the sensor module 1. In an application in which a DC output of the sensor module 1 directly becomes the measurement target such as a tiltmeter using the sensor module 1, the vibration rectification error becomes a factor of a serious measurement error. As main mechanisms of causing the vibration rectification error, there can be cited three mechanisms, namely [1] a vibration rectification error due to an asymmetric rail, [2] a vibration rectification error due to nonlinearity in scale factor, and [3] a vibration rectification error due to a structural resonance of the physical quantity sensor 200.

[1] Vibration Rectification Error Caused by Asymmetric Rail

When a sensitivity axis of the physical quantity sensor 200 is set in a gravitational acceleration direction, in the measurement value of the sensor module 1, there occurs an offset corresponding to the fact that the gravitational acceleration is 1 g=9.8 m/s$^2$. For example, when a dynamic range of the physical quantity sensor 200 is 2 g, the vibration which can be measured without clipping is up to a vibration of 1 g. When a vibration exceeding 1 g is applied in this state, the clipping occurs in an asymmetric manner, and therefore, the vibration rectification error is included in the measurement value as a result.

For example, when the dynamic range is as broad as 15 g, the clipping hardly matters in an ordinary use environment. On the other hand, the physical quantity sensor 200 incorporates a physical protection mechanism for the purpose of preventing breakage of the physical quantity detection element 40, and since the protection mechanism works when the vibration level exceeds a certain threshold value, the clopping occurs. In order to prevent the above, it becomes necessary to devise the attachment for arranging the sensor module 1 to perform a countermeasure such as damping of a vibration in a resonance frequency band.

[2] Vibration Rectification Error Caused by Nonlinearity in Scale Factor

Figure 9:
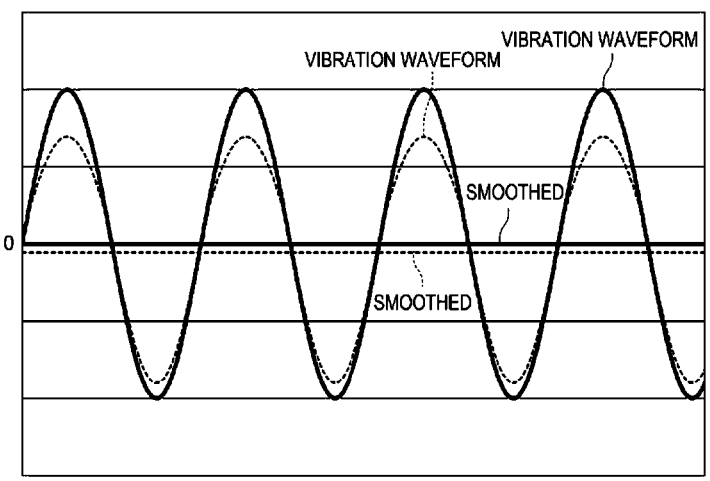
FIG. 9 is a diagram for explaining in principle that a vibration rectification error is caused by an output waveform distortion.

FIG. 9 is a diagram for explaining in principle that the vibration rectification error is caused by an output waveform distortion. In FIG. 9, solid lines represent a vibration waveform of a sine wave and a waveform obtained by smoothing the vibration waveform, and dotted lines represent a vibration waveform vertically asymmetric about the vibration center and a waveform obtained by smoothing that vibration waveform. The smoothed waveform represented by the solid line takes 0 on the one hand, the smoothed waveform represented by the dotted line takes a negative value, and thus, an offset occurs when performing the smoothing.

Figure 10:
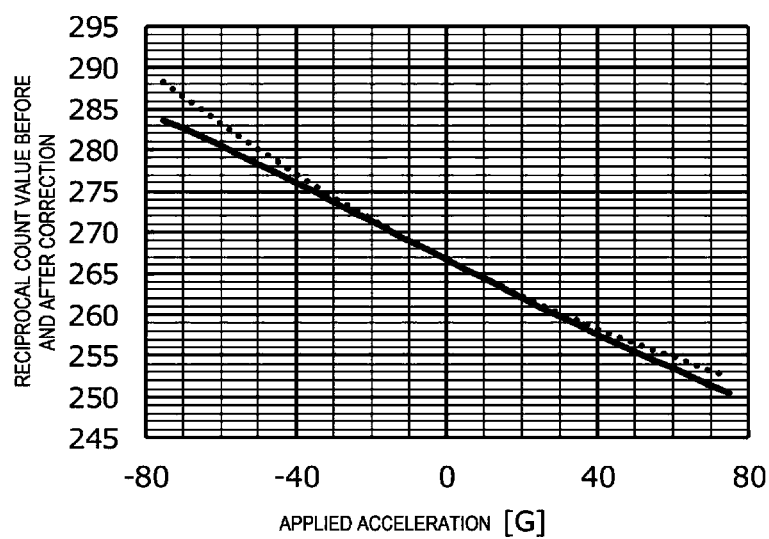
FIG. 10 is a diagram showing nonlinearity between the acceleration to be applied and a reciprocal count value.
Figure 11:
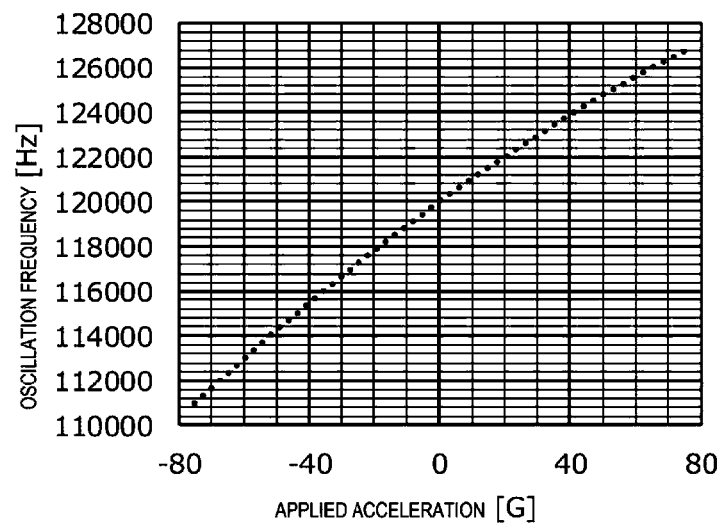
FIG. 11 is a diagram showing nonlinearity between the acceleration to be applied and an oscillation frequency of the physical quantity sensor.
Figure 12:
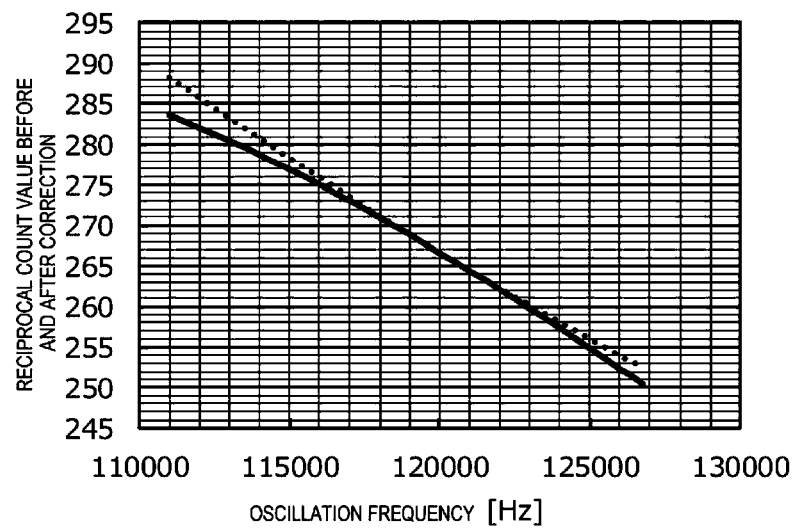
FIG. 12 is a diagram showing nonlinearity between the oscillation frequency of the physical quantity sensor and the reciprocal count value.

The physical quantity sensor 200 is a frequency variation sensor, and the count value CNT corresponding to the frequency ratio between the measurement target signal SIN and the reference signal CLK is a reciprocal count value. A relationship between the acceleration to be applied to the physical quantity sensor 200 and the reciprocal count value has nonlinearity. A dotted line shown in FIG. 10 represents nonlinearity between the acceleration to be applied and the reciprocal count value. Further, a dotted line shown in FIG. 11 represents nonlinearity between the acceleration to be applied and the oscillation frequency of the physical quantity sensor 200. Further, a dotted line shown in FIG. 12 represents nonlinearity between the oscillation frequency of the physical quantity sensor 200 and the reciprocal count value. A dotted line shown in FIG. 10 is obtained by combining the dotted line shown in FIG. 11 and the dotted line shown in FIG. 12.

Here, by correcting the relationship between the oscillation frequency and the reciprocal count value as represented by a solid line shown in FIG. 12, it is possible to approximate the relationship between the acceleration and the reciprocal count value to a linear relationship as represented by a solid line shown in FIG. 10. Specifically, it is possible for the micro-control unit 210 described above to correct the count value CNT using a correction function expressed by Formula (1).

$$Y=\{c-d\}^2 \quad (1)$$

In Formula (1), c represents the count value which has not been corrected, and which corresponds to the dotted line shown in FIG. 10, Y represents the count value which has been corrected, and which corresponds to the solid line shown in FIG. 10, and d represents a coefficient for deciding a degree of the correction shown in FIG. 12. For example, the coefficient d is stored in the storage 220, or is set by the processing device 3.

[3] Vibration Rectification Error Caused by Cantilever Resonance

As a detection principle of acceleration, the physical quantity sensor 200 transmits a distortion in a cantilever attached with a weight due to the acceleration to the physical quantity detection element 40 as a double tuning-fork vibrator to thereby vary tensile force acting on the physical quantity detection element 40, and thus, varies the oscillation frequency. Therefore, the physical quantity detection element 40 has the resonance frequency caused by a structure of the cantilever, and when the cantilever resonance is exited, an inherent vibration rectification error occurs. The cantilever resonance has a frequency higher than the frequency band corresponding to a range of detectable acceleration, and a vibration component of the cantilever resonance is removed by an internal low-pass filter of the vibration rectification error correction device 2, but the vibration rectification error occurs as a bias offset reflecting the nonlinearity of the vibration. As an amplitude of the cantilever resonance increases, the nonlinearity in the output waveform of the physical quantity sensor 200 increases, and thus, the vibration rectification error also increases. Therefore, reducing the vibration rectification error caused by the cantilever resonance will be the key issue.

In the present embodiment, since the frequency ratio measurement circuit 202 is of the reciprocal count type which counts the number of pulses of the reference signal CLK included in the predetermined period of the measurement target signal SIN, the timing at which the count value is obtained is synchronized with the measurement target signal SIN. On the other hand, the count value CNT output from the frequency ratio measurement circuit 202 is required to be synchronized with the first frequency signal CLK1, and since the timing at which the count value of the number of pulses of the reference signal CLK is obtained and the first frequency signal CLK1 are not synchronized with each other, resampling becomes necessary. In the frequency ratio measurement circuit 202, by devising the configuration necessary for the resampling, it is possible to generate the count value CNT in which the vibration rectification error caused by the cantilever resonance is corrected.

1-5. Configuration of Frequency Ratio Measurement Circuit

Figure 13:
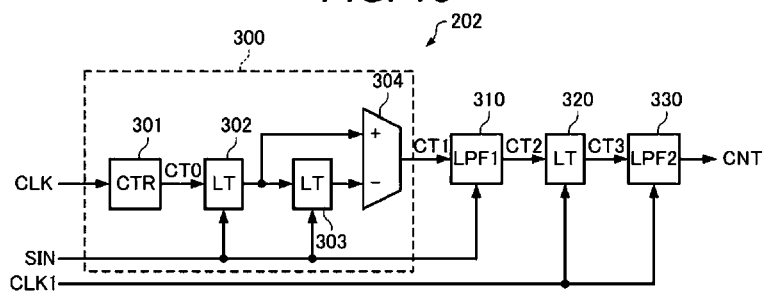
FIG. 13 is a diagram showing a configuration example of a frequency ratio measurement circuit in the first embodiment.

The frequency ratio measurement circuit 202 measures a frequency ratio between the measurement target signal SIN and the reference signal CLK using the reciprocal count method. FIG. 13 is a diagram showing a configuration example of the frequency ratio measurement circuit 202 in the first embodiment. As shown in FIG. 13, the frequency ratio measurement circuit 202 is provided with a frequency delta-sigma modulation circuit 300, a first low-pass filter 310, a latch circuit 320, and a second low-pass filter 330.

The frequency delta-sigma modulation circuit 300 performs the frequency delta-sigma modulation on the reference signal CLK using the measurement target signal SIN to generate a frequency delta-sigma modulation signal. The frequency delta-sigma modulation circuit 300 is provided with a counter 301, a latch circuit 302, a latch circuit 303, and a subtractor 304. The counter 301 counts rising edges of the reference signal CLK to output a count value CT0. The latch circuit 302 latches the count value CT0 in sync with a rising edge of the measurement target signal SIN to hold the count value CT0. The latch circuit 303 latches the count value held by the latch circuit 302 in sync with a rising edge of the measurement target signal SIN to hold the count value. The subtractor 304 subtracts the count value held by the latch circuit 303 from the count value held by the latch circuit 302 to generate and then output a count value CT1. The count value CT1 is the frequency delta-sigma modulation signal to be generated by the frequency delta-sigma modulation circuit 300.

The frequency delta-sigma modulation circuit 300 is also called a first-order frequency delta-sigma modulator, and latches the count value of the number of pulses of the reference signal CLK twice with the measurement target signal SIN, and sequentially holds the count value of the number of pulses of the reference signal CLK using the rising edges of the measurement target signal SIN as the triggers. Here, there is presented the explanation assuming that the frequency delta-sigma modulation circuit 300 performs the latch action with the rising edge of the measurement target signal SIN, but it is possible to perform the latch action with a falling edge or both of the rising edge and the falling edge. Further, the subtractor 304 calculates a difference between the two count values respectively held by the latch circuits 302, 303 to thereby output an increment of the count value of the number of pulses of the reference signal CLK measured during a transition corresponding to one cycle of the measurement target signal SIN with elapse of time without a dead period. When defining the frequency of the measurement target signal SIN as fx, and the frequency of the reference signal CLK as fc, the frequency ratio is obtained as fc/fx. The frequency delta-sigma modulation circuit 300 is for outputting the frequency delta-sigma modulation signal representing a frequency ratio as a digital signal string.

The first low-pass filter 310 is disposed in a posterior stage of the frequency delta-sigma modulation circuit 300, and operates in sync with the measurement target signal SIN. The first low-pass filter 310 outputs a count value CT2 obtained by removing or reducing a noise component included in the count value CT1 as the frequency delta-sigma modulation signal. Although the first low-pass filter 310 is disposed immediately after the frequency delta-sigma modulation circuit 300 in FIG. 13, it is sufficient for the first low-pass filter 310 to be disposed on a signal path from an output of the frequency delta-sigma modulation circuit 300 to an input of the second low-pass filter 330.

The latch circuit 320 is disposed in a posterior stage of the first low-pass filter 310, latches the count value CT2 output from the first low-pass filter 310 in sync with the first frequency signal CLK1, and then holds the result as a count value CT3.

The second low-pass filter 330 is disposed in a posterior stage of the first low-pass filter 310, and operates in sync with the first frequency signal CLK1 asynchronous with the reference signal CLK. The second low-pass filter 330 outputs a count value obtained by removing or reducing a noise component included in the count value CT3 held by the latch circuit 320. The count value output from the second low-pass filter 330 is output to the micro-control unit 210 as the count value CNT. Since the first frequency signal CLK1 is a signal based on the external trigger signal EXTRG, the count value CNT is a count value synchronized with the external trigger signal EXTRG.

As described above, the frequency ratio measurement circuit 202 measures the frequency ratio between the measurement target signal SIN and the reference signal CLK. However, since a reciprocal of a frequency is a period, it can be said that the frequency ratio measurement circuit 202 measures a period ratio between the measurement target signal SIN and the reference signal CLK.

Figure 14:
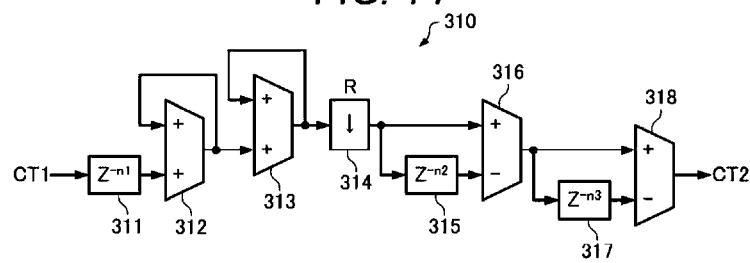
FIG. 14 is a diagram showing a configuration example of a first low-pass filter.

FIG. 14 is a diagram showing a configuration example of the first low-pass filter 310. In the example shown in FIG. 14, the first low-pass filter 310 has a delay element 311, an integrator 312, an integrator 313, a decimator 314, a delay element 315, a differentiator 316, a delay element 317, and a differentiator 318. The constituents of the first low-pass filter 310 operate in sync with the measurement target signal SIN.

The delay element 311 outputs a count value obtained by delaying the count value CT1 in sync with the measurement target signal SIN. The number of taps of the delay element 311 is n1. For example, the delay element 311 is realized by a shift register having n1 registers coupled in series to each other.

The integrator 312 outputs a count value obtained by accumulating the count value output from the delay element 311 in sync with the measurement target signal SIN.

The integrator 313 outputs a count value obtained by accumulating the count value output from the integrator 312 in sync with the measurement target signal SIN.

The decimator 314 outputs a count value obtained by decimating the count value output from the integrator 313 into a rate of 1/R in sync with the measurement target signal SIN.

The delay element 315 outputs a count value obtained by delaying the count value output from the decimator 314 in sync with the measurement target signal SIN. The number of taps of the delay element 315 is n2. For example, the delay element 315 is realized by a shift register having n2 registers coupled in series to each other.

The differentiator 316 outputs a count value obtained by subtracting the count value output from the delay element 315 from the count value output from the decimator 314.

The delay element 317 outputs a count value obtained by delaying the count value output from the differentiator 316 in sync with the measurement target signal SIN. The number of taps of the delay element 317 is n3. For example, the delay element 317 is realized by a shift register having n3 registers coupled in series to each other.

The differentiator 318 outputs the count value CT2 obtained by subtracting the count value output from the delay element 317 from the count value output from the differentiator 316.

Figure 15:
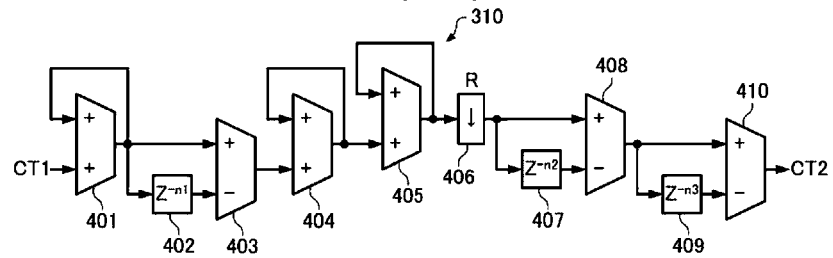
FIG. 15 is a diagram showing another configuration example of the first low-pass filter.

FIG. 15 is a diagram showing another configuration example of the first low-pass filter 310. In the example shown in FIG. 15, the first low-pass filter 310 has an integrator 401, a delay element 402, a differentiator 403, an integrator 404, an integrator 405, a decimator 406, a delay element 407, a differentiator 408, a delay element 409, and a differentiator 410. The constituents of the first low-pass filter 310 operate in sync with the measurement target signal SIN.

The integrator 401 outputs a count value obtained by accumulating the count value CT1 in sync with the measurement target signal SIN.

The delay element 402 outputs a count value obtained by delaying the count value output from the integrator 401 in sync with the measurement target signal SIN. The number of taps of the delay element 402 is n1. For example, the delay element 402 is realized by a shift register having n1 registers coupled in series to each other.

The differentiator 403 outputs a count value obtained by subtracting the count value output from the delay element 402 from the count value output from the integrator 401.

The integrator 404 outputs a count value obtained by accumulating the count value output from the differentiator 403 in sync with the measurement target signal SIN.

The integrator 405 outputs a count value obtained by accumulating the count value output from the integrator 404 in sync with the measurement target signal SIN.

The decimator 406 outputs a count value obtained by decimating the count value output from the integrator 405 into a rate of 1/R in sync with the measurement target signal SIN.

The delay element 407 outputs a count value obtained by delaying the count value output from the decimator 406 in sync with the measurement target signal SIN. The number of taps of the delay element 407 is n2. For example, the delay element 407 is realized by a shift register having n2 registers coupled in series to each other.

The differentiator 408 outputs a count value obtained by subtracting the count value output from the delay element 407 from the count value output from the decimator 406.

The delay element 409 outputs a count value obtained by delaying the count value output from the differentiator 408 in sync with the measurement target signal SIN. The number of taps of the delay element 409 is n3. For example, the delay element 409 is realized by a shift register having n3 registers coupled in series to each other.

The differentiator 410 outputs the count value CT2 obtained by subtracting the count value output from the delay element 409 from the count value output from the differentiator 408.

In FIG. 14 or FIG. 15, for example, a decimation ratio R is fixed, and the numbers of taps n1, n2, and n3 are variable. The numbers of taps n1, n2, and n3 are stored in the storage 220, or are set by the processing device 3.

The first low-pass filter 310 configured as shown in FIG. 14 or FIG. 15 functions as a CIC filter the group delay amount of which can be varied in accordance with the numbers of taps n1, n2, and n3. CIC is an abbreviation of Cascaded Integrator Comb.

Figure 16:
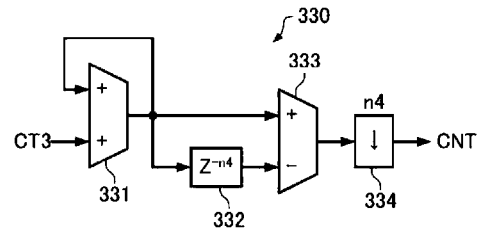
FIG. 16 is a diagram showing a configuration example of a second low-pass filter.

FIG. 16 is a diagram showing a configuration example of the second low-pass filter 330. In the example shown in FIG. 16, the second low-pass filter 330 has an integrator 331, a delay element 332, a differentiator 333, and a decimator 334. The constituents of the second low-pass filter 330 operate in sync with the first frequency signal CLK1.

The integrator 331 outputs a count value obtained by accumulating the count value CT3 in sync with the first frequency signal CLK1.

The delay element 332 outputs a count value obtained by delaying the count value output from the integrator 331 in sync with the first frequency signal CLK1. The number of taps of the delay element 332 is n4. For example, the delay element 332 is realized by a shift register having n4 registers coupled in series to each other. The number of taps n4 is variable. The number of taps n4 is stored in the storage 220, or is set by the processing device 3.

The differentiator 333 outputs a count value obtained by subtracting the count value output from the delay element 332 from the count value output from the integrator 331.

The decimator 334 outputs a count value CNT obtained by decimating the count value output from the differentiator 333 into a rate of 1/n4 in sync with the first frequency signal CLK1.

The second low-pass filter 330 configured as described above accumulates the count value CT3 while resampling the count value CT3 with the first frequency signal CLK1, and therefore functions as a weighted moving average filter which weights the count value CT3 with the duration thereof.

As described above, the first low-pass filter 310 operates in sync with the measurement target signal SIN, and the second low-pass filter 330 performs the resampling in sync with the first frequency signal CLK1, whereby there occurs the nonlinearity in the input and the output of the frequency ratio measurement circuit 202. Therefore, the count value CNT output from the frequency ratio measurement circuit 202 includes the vibration rectification error caused by the nonlinearity. Further, by adjusting at least one of the number of taps n1 of the delay element 311 or the delay element 402 provided to the first low-pass filter 310, the number of taps n2 of the delay element 315 or the delay element 407 provided to the first low-pass filter 310, the number of taps n3 of the delay element 317 or the delay element 409 provided to the first low-pass filter 310, and the number of taps n4 of the delay element 332 provided to the second low-pass filter 330, it is possible to adjust the vibration rectification error.

Figure 17:
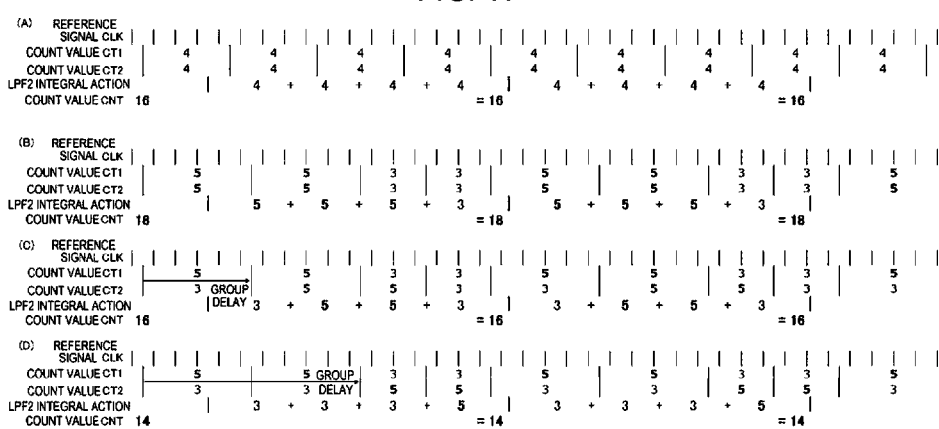
FIG. 17 is a diagram for explaining that it is possible to adjust the vibration rectification error caused by the nonlinearity of input and output of the frequency ratio measurement circuit.

FIG. 17 is a diagram for explaining that it is possible to adjust the vibration rectification error caused by the nonlinearity of the input and the output of the frequency ratio measurement circuit 202. In FIG. 17, there is shown an example when the period of the measurement target signal SIN is longer than the period of the reference signal CLK, and an updating cycle of the count value CNT is longer than the period of measurement target signal SIN, and the horizontal axis corresponds to elapse of time. In FIG. 17, regarding the reference signal CLK, the timing of the rising edge is represented by a short vertical line. Further, regarding the count values CT1, CT2, the timing at which the value changes is represented by a short vertical line. It should be noted that in FIG. 17, simplified numerical values are used for making the understanding easy for the purpose of describing the adjustment mechanism of the vibration rectification error. Further, there is presented the description as if the count value CT2 is fixed before the count value CT1 is fixed despite the count value CT2 is not fixed until the count value CT1 is fixed, but the actual calculation of the count value CT2 is executed after the count value CT1 is fixed.

In FIG. 17, (A) shows an example when the period of the measurement target signal SIN is constant, and (B), (C), and (D) show examples when a frequency modulation is performed on the measurement target signal SIN. In (B), (C), and (D), the group delay amount of the first low-pass filter 310 is different therebetween. For the sake of simplification, it is assumed that the ratio between the period of the reference signal CLK and the period of the measurement target signal SIN is a simple integral ratio, and the count value CT1 input to the first low-pass filter 310 is directly output with a constant group delay. The second low-pass filter 330 accumulates the count value CT3 obtained by latching the count value CT2 output from the first low-pass filter 310 in sync with the first frequency signal CLK1, and then outputs the accumulated value corresponding to four times of accumulation as the count value CNT.

In the example (A), the count value CT2 is always 4, and the count value CNT becomes 4×4=16. In the example (B), since the frequency modulation is performed on the measurement target signal SIN, and the group delay of the first low-pass filter 310 is set to 0, the count value CT2 repeats to take 5, 5, 3, and 3. Since the weighting with time is performed when performing the accumulation, the count value CNT becomes 5×3+3×1=18, which is larger than the count value CNT in (A). In the example (C), the count value CT2 repeats to take 5, 5, 3, and 3 similarly to the example (B), but there is described when the group delay occurs in the first low-pass filter 310. As a result of the weighting with time in the accumulation, the count value CNT becomes 5×2+3×2=16, which is the same as the count value CNT in (A). In the example (D), the count value CT2 repeats to take 5, 5, 3, and 3 similarly to the examples (B) and (C), but there is described when the group delay occurring in the first low-pass filter 310 is larger compared to the example (C). In the example (D), the count value CNT becomes 5×1+3× 3=14, which is smaller than the count value CNT in (A).

According to the consideration using FIG. 17, it can qualitatively be understood that the vibration rectification error caused by the nonlinearity in the input and the output of the frequency ratio measurement circuit 202 varies in accordance with the group delay amount of the first low-pass filter 310. Similarly, the vibration rectification error caused by the nonlinearity of the input and the output of the frequency ratio measurement circuit 202 varies in accordance with the group delay amount of the second low-pass filter 330. Therefore, by controlling the group delay amounts of the first low-pass filter 310 and the second low-pass filter 330 so that the vibration rectification error caused by the nonlinearity of the input and the output of the frequency ratio measurement circuit 202 becomes opposite in phase to the vibration rectification error caused by the cantilever resonance, it becomes possible to cancel out each other's vibration rectification error. The group delay amount of the first low-pass filter 310 can be controlled by the setting of the numbers of taps n1, n2, and n3 shown in FIG. 14 or FIG. 15. Further, the group delay amount of the second low-pass filter 330 can be controlled by the setting of the number of taps n4 shown in FIG. 16. Therefore, in the present embodiment, the storage 220 stores the numbers of taps n1, n2, n3, and n4 as the information for controlling the group delay amount of the first low-pass filter 310 and the group delay amount of the second low-pass filter 330.

Figure 18:
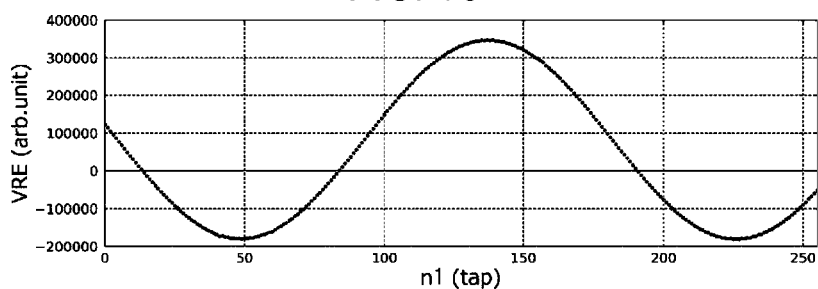
FIG. 18 is a diagram showing a dependency of the vibration rectification error included in the measurement value to a tap number.

As an example, FIG. 18 shows dependency of the vibration rectification error included in the measurement value by the vibration rectification error correction device 2 to the number of taps n1 when fixing the numbers of taps n2, n3, and n4. In FIG. 18, the horizontal axis represents the number of taps n1, and the vertical axis represents the vibration rectification error. It should be noted that VRE in the vertical axis is an abbreviation of Vibration Rectification Error. According to FIG. 18, when, for example, appropriately setting the number of taps n1, it is possible to correct the vibration rectification error to approximate the vibration rectification error to 0.

Figure 19:
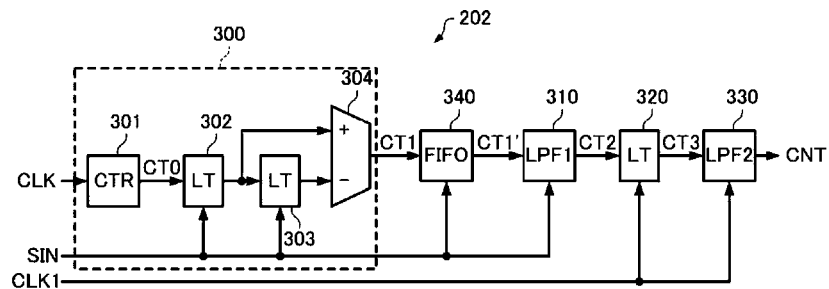
FIG. 19 is a diagram showing another configuration example of the frequency ratio measurement circuit in the first embodiment.
Figure 20:
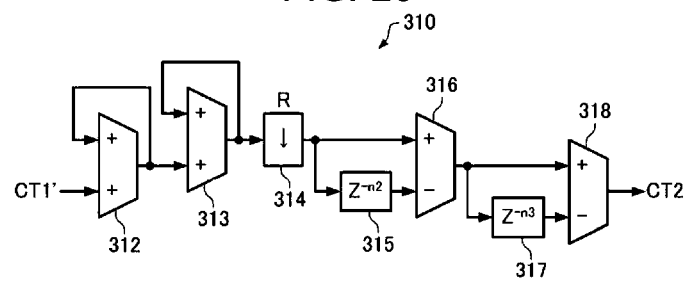
FIG. 20 is a diagram showing another configuration example of the first low-pass filter.

In the first low-pass filter 310 having a configuration shown in FIG. 14, since the delay element 311 is realized by a FIFO register using a shift register, when taking out the FIFO register to the outside of the first low-pass filter 310, the frequency ratio measurement circuit 202 having the configuration shown in FIG. 13 becomes to have a configuration shown in FIG. 19, and the first low-pass filter 310 having the configuration shown in FIG. 14 becomes to have a configuration shown in FIG. 20. FIFO is an abbreviation of First In First Out.

Figure 21:
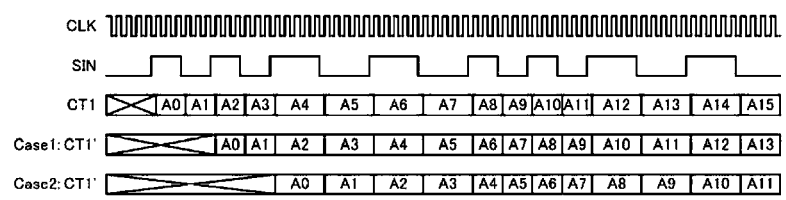
FIG. 21 is a timing chart of the count value input to and output from a FIFO register.

FIG. 21 shows an example of a timing chart of the count value CT1 input to the FIFO register 340, and a count value CT1' output from the FIFO register 340. In the example shown in FIG. 21, the count values CT1, CT1' vary in sync with both edges of the measurement target signal SIN. In other words, in the example shown in FIG. 21, the frequency delta-sigma modulation circuit 300 and the FIFO register 340 operate in sync with the both edges of the measurement target signal SIN. Case1 represents when the number of stages of the FIFO register 340 is 2, and Case2 represents when the number of stages of the FIFO register 340 is 4.

Also in the frequency ratio measurement circuit 202 having the configuration shown in FIG. 19, by appropriately setting the number of stages of the FIFO register 340 which is equivalent to the number of taps n1 of the delay element 311, the group delay amount of the first low-pass filter 310, and the group delay amount of the second low-pass filter 330, it is possible to correct the vibration rectification error to approximate the vibration rectification error to 0.

Meanwhile, when the vibration component to be input to the physical quantity sensor 200 includes a frequency of the structural resonance decided by the structure of the physical quantity sensor 200, there occurs the structural resonance of the physical quantity sensor 200. As a result, the output signal of the physical quantity sensor 200 includes a signal component caused by the structural resonance. The signal component caused by the structural resonance is not a signal taken as a detection target by the physical quantity sensor 200, and therefore, is not desirably included in the count value CNT output from the frequency ratio measurement circuit 202. Therefore, in the present embodiment, a cutoff frequency based on the first low-pass filter 310 and the second low-pass filter 330 is lower than the frequency related to the structural resonance of the physical quantity sensor 200. For example, it is possible to make a cutoff frequency of the first low-pass filter 310 higher than the frequency related to the structural resonance of the physical quantity sensor 200, and a cutoff frequency of the second low-pass filter 330 lower than the frequency related to the structural resonance of the physical quantity sensor 200. Alternatively, it is possible to make both of the cutoff frequency of the first low-pass filter 310 and the cutoff frequency of the second low-pass filter 330 lower than the frequency related to the structural resonance of the physical quantity sensor 200. In the present embodiment, the structural resonance of the physical quantity sensor 200 is the cantilever resonance. It should be noted that the first low-pass filter 310 is an example of a "first filter," and the second low-pass filter 330 is an example of a "second filter."

1-6. Vibration Rectification Error Correction Method

Figure 22:
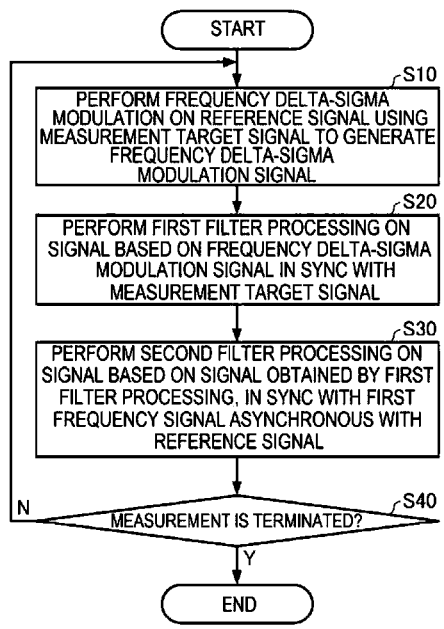
FIG. 22 is a flowchart showing an example of a procedure of a vibration rectification error correction method according to the first embodiment.

FIG. 22 is a flowchart showing an example of a procedure of a vibration rectification error correction method by the vibration rectification error correction device 2 equipped with the frequency ratio measurement circuit 202 having the configuration shown in FIG. 13 or the configuration shown in FIG. 19.

As shown in FIG. 22, first, in the step S10, the vibration rectification error correction device 2 performs the frequency delta-sigma modulation on the reference signal CLK using the measurement target signal SIN to generate the frequency delta-sigma modulation signal.

Then, in the step S20, the vibration rectification error correction device 2 performs first filter processing on a signal based on the count value CT1 as the frequency delta-sigma modulation signal generated in the step S10 in sync with the measurement target signal SIN. Specifically, the vibration rectification error correction device 2 equipped with the frequency ratio measurement circuit 202 shown in FIG. 13 performs the first filter processing on the count value CT1 in sync with the measurement target signal SIN. Further, the vibration rectification error correction device 2 equipped with the frequency ratio measurement circuit 202 shown in FIG. 19 performs the first filter processing on the count value CT1' in sync with the measurement target signal SIN. For example, the first filter processing is low-pass filter processing.

Then, in the step S30, the vibration rectification error correction device 2 performs second filter processing on the count value CT3 as a signal based on the count value CT2 as a signal obtained by the first filter processing in the step S20, in sync with the first frequency signal CLK1 asynchronous with the reference signal CLK. The first frequency signal CLK1 is a signal based on the external trigger signal EXTRG input from the outside of the sensor module 1. For example, the second filter processing is low-pass filter processing.

Then, in the step S40, the vibration rectification error correction device 2 repeatedly performs the steps S10, S20, and S30 until the measurement is terminated.

1-7. Functions and Advantages

As described hereinabove, in the sensor module 1 according to the first embodiment, by the frequency delta-sigma modulation circuit 300 performing the frequency delta-sigma modulation on the reference signal CLK using the measurement target signal SIN based on the output signal of the physical quantity sensor 200, the count value CT1 as the frequency delta-sigma modulation signal representing the frequency ratio between the measurement target signal SIN and the reference signal CLK is generated in the vibration rectification error correction device 2. Further, in the vibration rectification error correction device 2, the first low-pass filter 310 disposed in the posterior stage of the frequency delta-sigma modulation circuit 300 operates in sync with the measurement target signal SIN, and the second low-pass filter 330 disposed in the posterior stage of the first low-pass filter 310 operates in sync with the first frequency signal CLK1 different from the measurement target signal SIN, and thus, the nonlinearity occurs in the relationship between the count value CT1 and the count value CNT output from the second low-pass filter 330. Further, the vibration rectification error caused by the nonlinearity varies in accordance with the group delay amount of the first low-pass filter 310 and the group delay amount of the second low-pass filter 330. Therefore, according to the sensor module 1 related to the first embodiment, by setting the group delay amount of the first low-pass filter 310 and the group delay amount of the second low-pass filter 330 to appropriate values in the vibration rectification error correction device 2, the vibration rectification error caused by the nonlinearity and the vibration rectification error caused by the asymmetry of the measurement target signal SIN are canceled out each other, and thus, the vibration rectification error included in the count value CNT as measurement data based on the output signal of the physical quantity sensor 200 is reduced. In particular, in the vibration rectification error correction device 2, since the storage 220 stores information for controlling the group delay amount of the first low-pass filter 310 and the group delay amount of the second low-pass filter 330, by appropriately setting that information, the vibration rectification error included in the count value CNT is reduced.

Further, in the sensor module 1 according to the first embodiment, since the count value CNT output from the second low-pass filter 330 is synchronized with the first frequency signal CLK1 in the vibration rectification error correction device 2, neither a synchronization circuit large in circuit scale disposed in the posterior stage of the second low-pass filter 330 nor calculation in post-processing heavy in load is required to obtain the data synchronized with the first frequency signal CLK1. Therefore, according to the sensor module 1 related to the first embodiment, in the vibration rectification error correction device 2, neither the synchronization circuit large in circuit scale nor the calculation heavy in load is necessary to generate the count value CNT synchronized with the first frequency signal CLK1 asynchronous with the reference signal CLK.

Further, in the sensor module 1 according to the first embodiment, since the first frequency signal CLK1 is a signal based on the external trigger signal EXTRG in the vibration rectification error correction device 2, the count value CNT output from the second low-pass filter 330 is synchronous with the external trigger signal EXTRG. Therefore, according to the sensor module 1 related to the first embodiment, in the vibration rectification error correction device 2, neither the synchronization circuit large in circuit scale nor the calculation heavy in load is necessary to generate the count value CNT synchronized with the external trigger signal EXTRG.

Further, in the sensor module 1 according to the first embodiment, by making the cutoff frequency based on the first low-pass filter 310 and the second low-pass filter 330 lower than the frequency related to the structural resonance of the physical quantity sensor 200, it is possible for the vibration rectification error correction device 2 to generate the count value CNT in which a conspicuous noise component generated by the structural resonance of the physical quantity sensor 200 is reduced.

2. Second Embodiment

Hereinafter, regarding the sensor module according to a second embodiment, substantially the same constituents as those in the first embodiment will be denoted by the same reference numerals, and different contents from those in the first embodiment are mainly described while omitting or simplifying the description duplicating the first embodiment.

In the first embodiment, an adjustment resolution of the group delay amount of the first low-pass filter 310 is decided by the period of the measurement target signal SIN, and an adjustment resolution of the group delay amount of the second low-pass filter 330 is decided by the period of the first frequency signal CLK1 based on the external trigger signal EXTRG. Therefore, a correction resolution of the vibration rectification error is decided by shorter one of the period of the measurement target signal SIN and the period of the external trigger signal EXTRG. Therefore, when the period of the external trigger signal EXTRG is longer than the period of the measurement target signal SIN, the correction resolution of the vibration rectification error is decided by the period of the measurement target signal SIN, and therefore, there is a certain limit. Therefore, in the second embodiment, in order to improve the correction resolution of the vibration rectification error, the period of the first frequency signal CLK1 for making the second low-pass filter 330 operate is shortened to thereby improve the correction resolution of the vibration rectification error.

Figure 23:
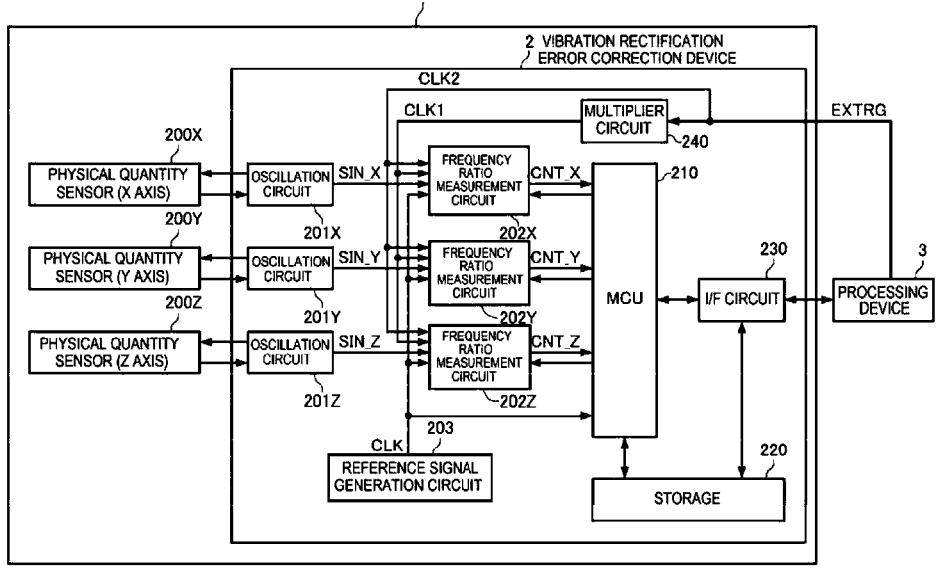
FIG. 23 is a functional block diagram of s sensor module according to a second embodiment.

FIG. 23 is a functional block diagram of the sensor module 1 according to the second embodiment. In FIG. 23, substantially the same constituents as those shown in FIG. 8 are denoted by the same reference numerals. Similarly to the first embodiment, the sensor module 1 according to the second embodiment is provided with the physical quantity sensors 200X, 200Y, and 200Z, and the vibration rectification error correction device 2. Functions and configurations of the physical quantity sensors 200X, 200Y, and 200Z are substantially the same as those in the first embodiment, and therefore the description thereof will be omitted.

The vibration rectification error correction device 2 includes the oscillation circuits 201X, 201Y, and 201Z, the frequency ratio measurement circuits 202X, 202Y, and 202Z, the micro-control unit 210, the storage 220, the interface circuit 230, and a multiplier circuit 240. Functions and configurations of the oscillation circuits 201X, 201Y, and 201Z, the micro-control unit 210, the storage 220, and the interface circuit 230 are substantially the same as those in the first embodiment, and therefore the description thereof will be omitted.

The multiplier circuit 240 multiplies a second frequency signal CLK2 asynchronous with the reference signal CLK. The second frequency signal CLK2 is a signal based on the external trigger signal EXTRG input from the outside of the sensor module 1. The second frequency signal CLK2 can be, for example, the external trigger signal EXTRG itself, or can also be a signal obtained by buffering the external trigger signal EXTRG. A multiplying factor of the multiplier circuit 240 can be an integer no smaller than 2. The multiplying factor of the multiplier circuit 240 can be fixed. Alternatively, the multiplying factor of the multiplier circuit 240 can be variable, and can be stored in the storage 220, or can be set by the processing device 3.

To each of the frequency ratio measurement circuits 202X, 202Y, and 202Z, there is input the first frequency signal CLK1 asynchronous with the reference signal CLK. The first frequency signal CLK1 is a signal based on an output signal of the multiplier circuit 240. The first frequency signal CLK1 can be, for example, the output signal of the multiplier circuit 240 itself, or can also be a signal obtained by buffering the output signal of the multiplier circuit 240. Then, the frequency ratio measurement circuits 202X, 202Y, and 202Z respectively output the count values CNT_X, CNT_Y, and CNT_Z in sync with the first frequency signal CLK1.

Figure 24:
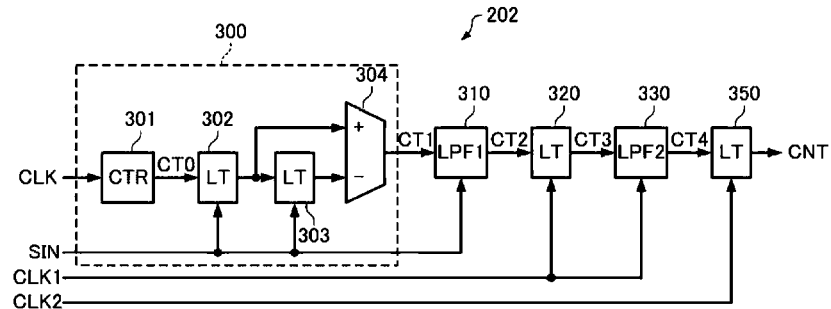
FIG. 24 is a diagram showing a configuration example of a frequency ratio measurement circuit in the second embodiment.

FIG. 24 is a diagram showing a configuration example of the frequency ratio measurement circuit 202 in the second embodiment. In FIG. 24, substantially the same constituents as those shown in FIG. 13 are denoted by the same reference numerals. The frequency ratio measurement circuit 202 shown in FIG. 24 is provided with the frequency delta-sigma modulation circuit 300, the first low-pass filter 310, the latch circuit 320, the second low-pass filter 330, and a latch circuit 350. Functions of the frequency delta-sigma modulation circuit 300, the first low-pass filter 310, the latch circuit 320, and the second low-pass filter 330 are substantially the same as in the first embodiment, and therefore, the description thereof will be omitted. Further, a configuration and a function of the first low-pass filter 310 are substantially the same as shown in FIG. 14 or FIG. 15, and therefore, the illustration and the description thereof will be omitted. Further, a configuration and a function of the second low-pass filter 330 are substantially the same as shown in FIG. 16 when the count value output from the decimator 334 is changed from CNT to CT4, and therefore, the illustration and the description thereof will be omitted. It should be noted that the second embodiment is different in the point that the first frequency signal CLK1 to be input to the latch circuit 320 and the second low-pass filter 330 is the signal based on the output signal of the multiplier circuit 240 from the first embodiment in which the first frequency signal CLK1 is the signal based on the external trigger signal EXTRG.

The latch circuit 350 is disposed in the posterior stage of the second low-pass filter 330, and operates in sync with the second frequency signal CLK2. Specifically, the latch circuit 350 latches the count value CT4 output from the second low-pass filter 330 in sync with the second frequency signal CLK2, and then holds the result as the count value CNT. The count value CNT held by the latch circuit 350 is output to the micro-control unit 210. Since the second frequency signal CLK2 is a signal based on the external trigger signal EXTRG, the count value CNT is a count value synchronized with the external trigger signal EXTRG.

Figure 25:
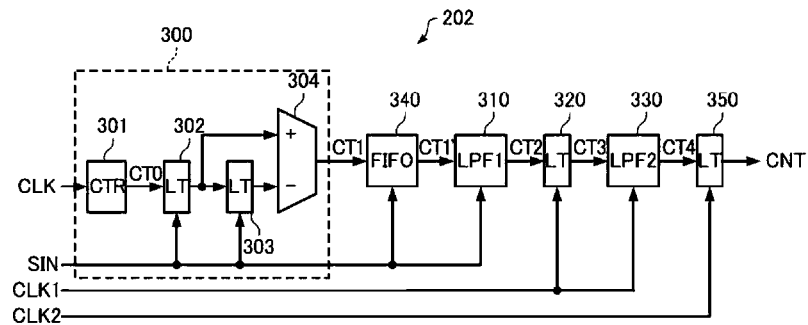
FIG. 25 is a diagram showing another configuration example of the frequency ratio measurement circuit in the second embodiment.

In the first low-pass filter 310 having the configuration shown in FIG. 14, since the delay element 311 is realized by the FIFO register using the shift register, when taking out the FIFO register to the outside of the first low-pass filter 310, the frequency ratio measurement circuit 202 having the configuration shown in FIG. 24 becomes to have a configuration shown in FIG. 25, and the first low-pass filter 310 having the configuration shown in FIG. 14 becomes to have the configuration shown in FIG. 20.

In the second embodiment, the adjustment resolution of the group delay amount of the first low-pass filter 310 is decided by the period of the measurement target signal SIN, and the adjustment resolution of the group delay amount of the second low-pass filter 330 is decided by the period of the first frequency signal CLK1 based on the output signal of the multiplier circuit 240. Therefore, by making the period of the first frequency signal CLK1 shorter than the period of the measurement target signal SIN, the correction resolution of the vibration rectification error is decided by the period of the first frequency signal CLK1, and therefore, a higher correction resolution than in the first embodiment is realized. Therefore, in the second embodiment, the multiplying factor of the multiplier circuit 240 is set so that the frequency of the first frequency signal CLK1 becomes higher than the frequency of the measurement target signal SIN. Further, since the frequency of the reference signal CLK is higher than the frequency of the measurement target signal SIN, it is preferable for the frequency of the first frequency signal CLK1 to be higher than the frequency of the reference signal CLK in order to further raise the correction resolution of the vibration rectification error.

Figure 26:
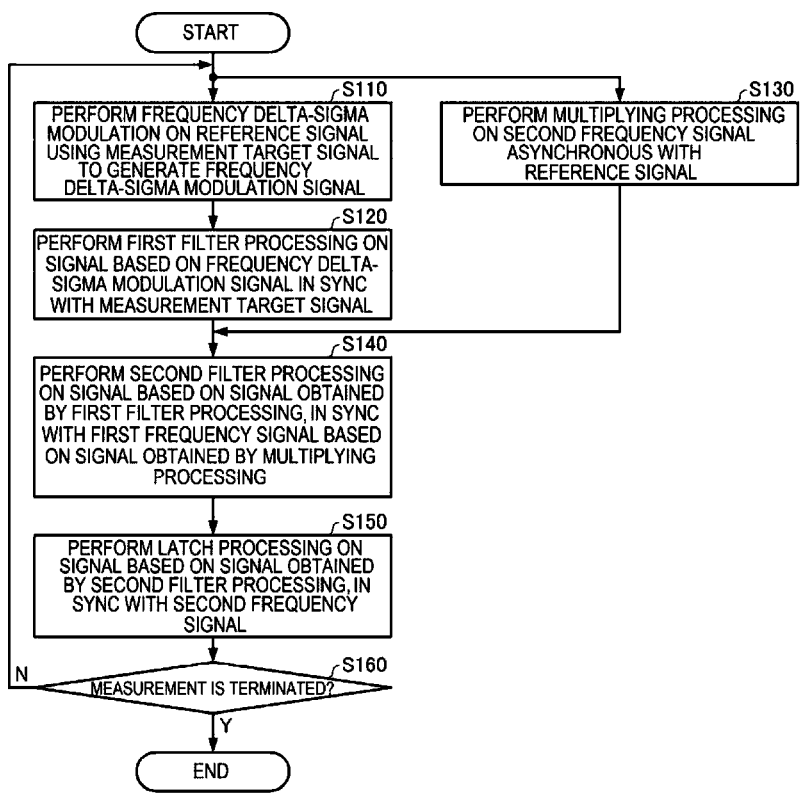
FIG. 26 is a flowchart showing an example of a procedure of a vibration rectification error correction method according to the second embodiment.

FIG. 26 is a flowchart showing an example of a procedure of a vibration rectification error correction method by the vibration rectification error correction device 2 equipped with the frequency ratio measurement circuit 202 having the configuration shown in FIG. 24 or the configuration shown in FIG. 25.

As shown in FIG. 26, first, in the step S110, the vibration rectification error correction device 2 performs the frequency delta-sigma modulation on the reference signal CLK using the measurement target signal SIN to generate the frequency delta-sigma modulation signal.

Then, in the step S120, the vibration rectification error correction device 2 performs the first filter processing on the signal based on the count value CT1 as the frequency delta-sigma modulation signal generated in the step S110, in sync with the measurement target signal SIN. Specifically, the vibration rectification error correction device 2 equipped with the frequency ratio measurement circuit 202 shown in FIG. 24 performs the first filter processing on the count value CT1 in sync with the measurement target signal SIN. Further, the vibration rectification error correction device 2 equipped with the frequency ratio measurement circuit 202 shown in FIG. 25 performs the first filter processing on the count value CT1' in sync with the measurement target signal SIN. For example, the first filter processing is the low-pass filter processing.

Further, in the step S130, the vibration rectification error correction device 2 performs multiplying processing on the second frequency signal CLK2 asynchronous with the reference signal CLK. The second frequency signal CLK2 is a signal based on the external trigger signal EXTRG input from the outside of the sensor module 1.

Then, in the step S140, the vibration rectification error correction device 2 performs the second filter processing on the count value CT3 as the signal based on the count value CT2 as the signal obtained by the first filter processing in the step S120, in sync with the first frequency signal CLK1 asynchronous with the reference signal CLK. The first frequency signal CLK1 is a signal based on a signal obtained by the multiplying processing in the step S130. It is preferable for the frequency of the first frequency signal CLK1 to be higher than the frequency of the reference signal CLK. For example, the second filter processing is the low-pass filter processing.

Then, in the step S150, the vibration rectification error correction device 2 performs latch processing on a signal based on the count value CT4 as a signal obtained by the second filter processing in the step S140, in sync with the second frequency signal CLK2.

Then, in the step S160, the vibration rectification error correction device 2 repeatedly performs the steps S110, S120, S130, S140, and S150 until the measurement is terminated.

As described hereinabove, in the sensor module 1 according to the second embodiment, by the frequency delta-sigma modulation circuit 300 performing the frequency delta-sigma modulation on the reference signal CLK using the measurement target signal SIN based on the output signal of the physical quantity sensor 200, the count value CT1 as the frequency delta-sigma modulation signal representing the frequency ratio between the measurement target signal SIN and the reference signal CLK is generated in the vibration rectification error correction device 2. Further, in the vibration rectification error correction device 2, the first low-pass filter 310 disposed in the posterior stage of the frequency delta-sigma modulation circuit 300 operates in sync with the measurement target signal SIN, and the second low-pass filter 330 disposed in the posterior stage of the first low-pass filter 310 operates in sync with the first frequency signal CLK1 different from the measurement target signal SIN, and thus, the nonlinearity occurs in the relationship between the count value CT1, and the count value CT4 output from the second low-pass filter 330 and the count value CNT output from the latch circuit 350. Further, the vibration rectification error caused by the nonlinearity varies in accordance with the group delay amount of the first low-pass filter 310 and the group delay amount of the second low-pass filter 330. Therefore, according to the sensor module 1 related to the second embodiment, by setting the group delay amount of the first low-pass filter 310 and the group delay amount of the second low-pass filter 330 to appropriate values in the vibration rectification error correction device 2, the vibration rectification error caused by the nonlinearity and the vibration rectification error caused by the asymmetry of the measurement target signal SIN are canceled out each other, and thus, the vibration rectification error included in the count value CNT as measurement data based on the output signal of the physical quantity sensor 200 is reduced. In particular, in the vibration rectification error correction device 2, since the storage 220 stores the information for controlling the group delay amount of the first low-pass filter 310 and the group delay amount of the second low-pass filter 330, by appropriately setting that information, the vibration rectification error included in the count value CNT is reduced.

In particular, in the sensor module 1 according to the second embodiment, by making the frequency of the first frequency signal CLK1 based on the output signal of the multiplier circuit 240 higher than the frequency of the reference signal CLK in the vibration rectification error correction device 2, the adjustment resolution of the group delay amount of the second low-pass filter rises, and thus, it is possible to raise the correction resolution of the vibration rectification error. Therefore, according to the sensor module 1 related to the second embodiment, in the vibration rectification error correction device 2, by setting the group delay amount of the first low-pass filter 310 and the group delay amount of the second low-pass filter 330 to appropriate values, the vibration rectification error included in the count value CNT is further reduced.

Further, in the sensor module 1 according to the second embodiment, since the count value CNT output from the latch circuit 350 is synchronized with the second frequency signal CLK2 in the vibration rectification error correction device 2, neither a synchronization circuit large in circuit scale disposed in the posterior stage of the second low-pass filter 330 nor calculation in post-processing heavy in load is required to obtain the data synchronized with the second frequency signal CLK2. Therefore, according to the sensor module 1 related to the second embodiment, in the vibration rectification error correction device 2, neither the synchronization circuit large in circuit scale nor the calculation heavy in load is necessary to generate the count value CNT synchronized with the second frequency signal CLK2 asynchronous with the reference signal CLK.

Further, in the sensor module 1 according to the second embodiment, since the second frequency signal CLK2 is a signal based on the external trigger signal EXTRG in the vibration rectification error correction device 2, the count value CNT output from the latch circuit 350 is synchronous with the external trigger signal EXTRG. Therefore, according to the sensor module 1 related to the second embodiment, in the vibration rectification error correction device 2, neither the synchronization circuit large in circuit scale nor the calculation heavy in load is necessary to generate the count value CNT synchronized with the external trigger signal EXTRG.

Further, in the sensor module 1 according to the second embodiment, by making the cutoff frequency based on the first low-pass filter 310 and the second low-pass filter 330 lower than the frequency related to the structural resonance of the physical quantity sensor 200, it is possible for the vibration rectification error correction device 2 to generate the count value CNT in which a conspicuous noise component generated by the structural resonance of the physical quantity sensor 200 is reduced.

3. Modified Examples

The present disclosure is not limited to the present embodiments, but can be implemented with a variety of modifications within the scope or the spirit of the present disclosure.

Figure 27:
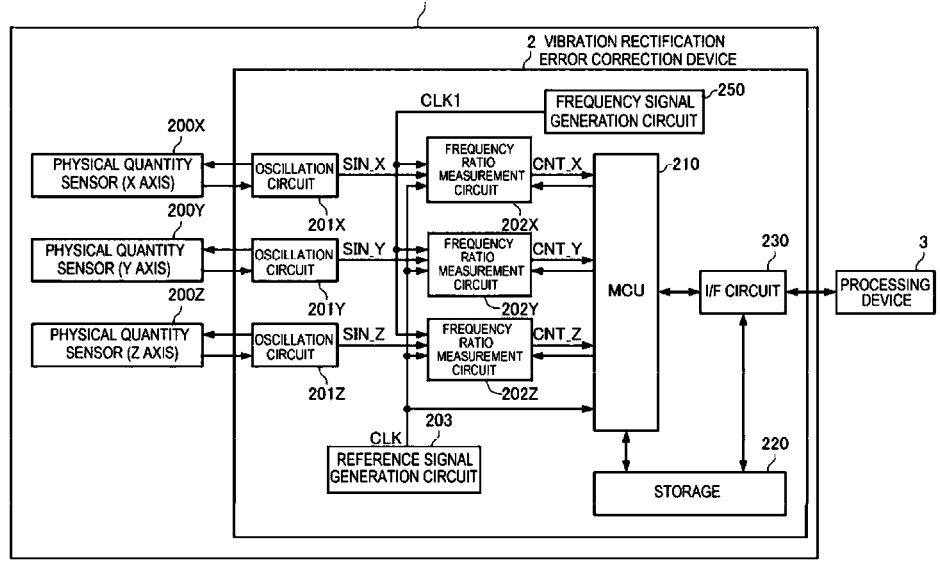
FIG. 27 is a functional block diagram of a sensor module according to a modified example.
Figure 28:
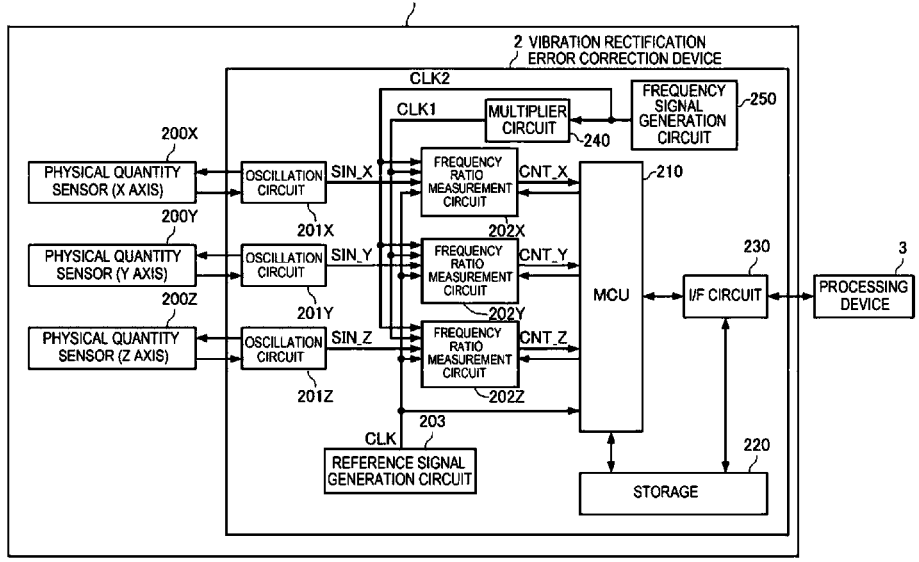
FIG. 28 is a functional block diagram of a sensor module according to another modified example.

For example, the first frequency signal CLK1 is the signal based on the external trigger signal EXTRG in each of the embodiments described above, but is not required to be the signal based on the external trigger signal EXTRG. For example, as shown in FIG. 27, it is possible for the vibration rectification error correction device 2 to be further provided with a frequency signal generation circuit 250 for generating the first frequency signal CLK1. Further, for example, as shown in FIG. 28, it is possible to adopt a configuration in which the vibration rectification error correction device 2 is further provided with the frequency signal generation circuit 250 for generating the second frequency signal CLK2, and the multiplier circuit 240 outputs the first frequency signal CLK1 obtained by multiplying the second frequency signal CLK2 generated by the frequency signal generation circuit 250.

Further, for example, in the second embodiment described above, when the updating cycle of the count value CT4 output from the second low-pass filter 330 coincides with the period of the second frequency signal CLK2, the latch circuit 350 can be eliminated. Similarly, in the flowchart shown in FIG. 26, when the updating cycle of the signal obtained by the second filter processing in the step S140 coincides with the period of the second frequency signal CLK2, the step S150 can be eliminated.

Further, for example, although the sensor module 1 has the three physical quantity sensors 200 and the three frequency ratio measurement circuits 202 in each of the embodiments described above, each of the number of the physical quantity sensors 200 provided to the sensor module 1 and the number of the frequency ratio measurement circuits 202 provided to the sensor module 1 can be one, two, or four or more.

Further, although the sensor module 1 provided with the acceleration sensors as the physical quantity sensors 200 is cited as an example in each of the embodiments described above, it is possible for the sensor module 1 to be provided with a sensor such an angular velocity sensor, a pressure sensor, or an optical sensor as the physical quantity sensor 200. Further, it is possible for the sensor module 1 to be provided with two or more types of physical quantity sensors out of the variety of sensors such as the acceleration sensor, the angular velocity sensor, the pressure sensor, and the optical sensor.

Further, although in each of the embodiments described above, there is cited the element configured using quartz crystal as the physical quantity detection element 40 provided to the physical quantity sensor 200 as an example, the physical quantity detection element 40 can be configured using a piezoelectric element other than quartz crystal, or can also be an MEMS element of a capacitance type. MEMS is an abbreviation of Micro Electro Mechanical Systems.

Further, although in each of the embodiments described above, the first low-pass filter 310 is cited as an example of the first filter, and the second low-pass filter 330 is cited as an example of the second filter, the first filter and the second filter can each be a high-pass filter, a band-pass filter, or a smoothing filter. Similarly, the first filter processing and the second filter processing can each be high-pass filter processing, band-pass filter processing, or smoothing filter processing besides the low-pass filter processing.

The embodiments and the modified examples described above are illustrative only, and the present disclosure is not limited to the embodiments and the modified examples. For example, it is also possible to arbitrarily combine any of the embodiments and the modified examples with each other.

The present disclosure includes configurations substantially the same as the configuration described as the embodiment such as configurations having the same function, the same way, and the same result, or configurations having the same object and the same advantage. Further, the present disclosure includes configurations obtained by replacing a non-essential part of the configuration described as the embodiment. Further, the present disclosure includes configurations providing the same functions and advantages, and configurations capable of achieving the same object as those of the configuration described as the embodiment. Further, the present disclosure includes configurations obtained by adding a known technology to the configuration described as the embodiment.

The following contents derive from the embodiments and the modified examples described above.

A vibration rectification error correction device according to an aspect of the present disclosure is provided with a reference signal generation circuit configured to output a reference signal, a frequency delta-sigma modulation circuit configured to perform a frequency delta-sigma modulation on the reference signal using a measurement target signal to generate a frequency delta-sigma modulation signal, a first filter which is disposed in a posterior stage of the frequency delta-sigma modulation circuit, and operates in sync with the measurement target signal, and a second filter which is disposed in a posterior stage of the first filter, and operates in sync with a first frequency signal asynchronous with the reference signal.

In this vibration rectification error correction device, the frequency delta-sigma modulation circuit performs the frequency delta-sigma modulation on the reference signal using the measurement target signal to thereby generate the frequency delta-sigma modulation signal representing a frequency ratio between the measurement target signal and the reference signal. Further, in this vibration rectification error correction device, the first filter disposed in the posterior stage of the frequency delta-sigma modulation circuit operates in sync with the measurement target signal, and the second filter disposed in the posterior stage of the first filter operates in sync with the first frequency signal different from the measurement target signal, and thus, the nonlinearity occurs in the relationship between the frequency delta-sigma modulation signal and the output signal of the second filter. Further, the vibration rectification error caused by the nonlinearity varies in accordance with the group delay amount of the first filter and the group delay amount of the second filter. Therefore, according to this vibration rectification error correction device, by setting the group delay amount of the first filter and the group delay amount of the second filter to appropriate values, the vibration rectification error caused by the nonlinearity and the vibration rectification error caused by the asymmetry of the measurement target signal are canceled out each other, and thus, the vibration rectification error included in output data of the second filter is reduced.

Further, in this vibration rectification error correction device, since the output data of the second filter is synchronized with the first frequency signal, neither a synchronization circuit large in circuit scale disposed in the posterior stage of the second filter nor calculation in post-processing heavy in load is required to obtain the data synchronized with the first frequency signal. Therefore, according to this vibration rectification error correction device, neither the synchronization circuit large in circuit scale nor the calculation heavy in load is necessary to generate the data synchronized with the first frequency signal asynchronous with the reference signal.

In the vibration rectification error correction device according to the aspect described above, the first frequency signal may be a signal based on an external trigger signal.

According to this vibration rectification error correction device, since the output data of the second filter is synchronized with the external trigger signal, neither the synchronization circuit large in circuit scale nor the calculation heavy in load is necessary to generate the data synchronized with the external trigger signal.

The vibration rectification error correction device according to the aspect may further be provided with a multiplier circuit configured to multiply a second frequency signal asynchronous with the reference signal, wherein the first frequency signal may be a signal based on an output signal of the multiplier circuit, and a frequency of the first frequency signal may be higher than a frequency of the reference signal.

In this vibration rectification error correction device, since the frequency of the first frequency signal based on the output signal of the multiplier circuit is higher than the frequency of the reference signal, the adjustment resolution of the group delay amount of the second filter rises, and thus, it is possible to raise the correction resolution of the vibration rectification error. Therefore, according to this vibration rectification error correction device, by setting the group delay amount of the first filter and the group delay amount of the second filter to appropriate values, the vibration rectification error included in the output data of the second filter is further reduced.

The vibration rectification error correction device according to the aspect may further be provided with a latch circuit which is disposed in a posterior stage of the second filter, and operates in sync with the second frequency signal.

According to this vibration rectification error correction device, it is possible to generate the data synchronized with the second frequency signal asynchronous with the reference signal without requiring neither the synchronization circuit large in circuit scale nor the calculation heavy in load.

In the vibration rectification error correction device according to the aspect described above, the second frequency signal may be a signal based on the external trigger signal.

According to this vibration rectification error correction device, since the output data of the latch circuit is synchronized with the external trigger signal, neither the synchronization circuit large in circuit scale nor the calculation heavy in load is necessary to generate the data synchronized with the external trigger signal.

The vibration rectification error correction device according to the aspect may further be provided with a storage configured to store information used to control the group delay amount of the first filter and the group delay amount of the second filter.

According to this vibration rectification error correction device, by appropriately setting the information for controlling the group delay amount of the first filter and the group delay amount of the second filter stored in the storage, the vibration rectification error included in the output data is reduced.

In the vibration rectification error correction device according to the aspect described above, the measurement target signal may be a signal based on an output signal of a physical quantity sensor.

According to this vibration rectification error correction device, it is possible to reduce the vibration rectification error in measurement data based on the output signal of the physical quantity sensor.

In the vibration rectification error correction device according to the aspect described above, a cutoff frequency based on the first filter and the second filter may be lower than a frequency related to a structural resonance of the physical quantity sensor.

According to this vibration rectification error correction device, it is possible to reduce the conspicuous noise component caused by the structural resonance of the physical quantity sensor with the first filter and the second filter.

A sensor module according to an aspect of the present disclosure is provided with the vibration rectification error correction device according to the aspect, and the physical quantity sensor.

According to this sensor module, since the vibration rectification error correction device is provided, it is possible to generate the measurement data with the vibration rectification error reduced.

A vibration rectification error correction method according to an aspect of the present disclosure is provided with performing a frequency delta-sigma modulation on a reference signal using a measurement target signal to generate a frequency delta-sigma modulation signal, performing first filter processing on a signal based on the frequency delta-sigma modulation signal in sync with the measurement target signal, and performing second filter processing on a signal based on a signal obtained by the first filter processing, in sync with a first frequency signal asynchronous with the reference signal.

In this vibration rectification error correction method, by performing the frequency delta-sigma modulation on the reference signal using the measurement target signal, the frequency delta-sigma modulation signal representing a frequency ratio between the measurement target signal and the reference signal is generated. Further, in this vibration rectification error correction method, by performing the first filter processing in sync with the measurement target signal, and performing the second filter processing in sync with the first frequency signal different from the measurement target signal, nonlinearity occurs in the relationship between the frequency delta-sigma modulation signal and the signal obtained by the second filter processing. Further, the vibration rectification error caused by the nonlinearity varies in accordance with the group delay amount in the first filter processing and the group delay amount in the second filter processing. Therefore, according to this vibration rectification error correction method, by setting the group delay amount in the first filter processing and the group delay amount in the second filter processing to appropriate values, the vibration rectification error caused by the nonlinearity and the vibration rectification error caused by the asymmetry of the measurement target signal are canceled out each other, and thus, the vibration rectification error included in the signal obtained by the second filter processing is reduced.

Further, in this vibration rectification error correction method, since the signal obtained by the second filter processing is synchronized with the first frequency signal, calculation in post-processing heavy in load is not required after the second low-pass filter processing in order to obtain the data synchronized with the first frequency signal. Therefore, according to this vibration rectification error correction method, the calculation heavy in load is not necessary to generate the data synchronized with the first frequency signal asynchronous with the reference signal.

The vibration rectification error correction method according to the aspect may further include performing multiplying processing on a second frequency signal asynchronous with the reference signal, wherein the first frequency signal may be a signal based on a signal obtained by the multiplying processing, and a frequency of the first frequency signal may be higher than a frequency of the reference signal.

In this vibration rectification error correction method, since the frequency of the first frequency signal based on the signal obtained by the multiplying processing is higher than the frequency of the reference signal, the adjustment resolution of the group delay amount in the second filter processing rises, and thus, it is possible to raise the correction resolution of the vibration rectification error. Therefore, according to this vibration rectification error correction method, by setting the group delay amount in the first filter processing and the group delay amount in the second filter processing to appropriate values, the vibration rectification error included in the signal obtained by the second filter processing is further reduced.

What is claimed is:

1. A vibration rectification error correction device comprising:
a reference signal generation circuit configured to output a reference signal;
a frequency delta-sigma modulation circuit configured to perform a frequency delta-sigma modulation on the reference signal using a measurement target signal to generate a frequency delta-sigma modulation signal;
a first filter which is disposed in a posterior stage of the frequency delta-sigma modulation circuit, receives the frequency delta-sigma modulation signal, operates a first filter operation on the frequency delta-sigma modulation signal in sync with the measurement target signal, and generates a first filtered signal; and a second filter which is disposed in a posterior stage of the first filter, and, receives the first filtered signal, receives a first frequency signal, operates a second filter operation on the first filtered signal in sync with the first frequency signal, and generates a second filtered signal, wherein the first frequency signal is asynchronous with the reference signal.

2. The vibration rectification error correction device according to claim 1, wherein the first frequency signal is a signal based on an external trigger signal.

3. The vibration rectification error correction device according to claim 1, further comprising:

a multiplier circuit configured to multiply a second frequency signal asynchronous with the reference signal, wherein the first frequency signal is a signal based on an output signal of the multiplier circuit, and a frequency of the first frequency signal is higher than a frequency of the reference signal.

4. The vibration rectification error correction device according to claim 3, further comprising:

a latch circuit which is disposed in a posterior stage of the second filter, and operates in sync with the second frequency signal.

5. The vibration rectification error correction device according to claim 3, wherein the second frequency signal is a signal based on an external trigger signal.

6. The vibration rectification error correction device according to claim 1, further comprising:

a storage configured to store information used to control a group delay amount of the first filter and a group delay amount of the second filter.

7. The vibration rectification error correction device according to claim 1, wherein the measurement target signal is a signal based on an output signal of a physical quantity sensor.

8. The vibration rectification error correction device according to claim 7, wherein a cutoff frequency based on the first filter and the second filter is lower than a frequency related to a structural resonance of the physical quantity sensor.

9. A sensor module comprising:

the vibration rectification error correction device according to claim 7; and the physical quantity sensor.

10. A vibration rectification error correction method comprising:

performing a frequency delta-sigma modulation on a reference signal using a measurement target signal to generate a frequency delta-sigma modulation signal;

performing first filter processing on the frequency delta-sigma modulation signal in sync with the measurement target signal to generate a first filtered signal; and performing second filter processing on the first filtered signal in sync with a first frequency signal to generate a second filtered signal, wherein the first frequency signal is asynchronous with the reference signal.

11. The vibration rectification error correction method according to claim 10, further comprising:

performing multiplying processing on a second frequency signal asynchronous with the reference signal, wherein the first frequency signal is a signal based on a signal obtained by the multiplying processing, and a frequency of the first frequency signal is higher than a frequency of the reference signal.

* * * * *